(12) United States Patent
Tanaka et al.

(10) Patent No.: US 8,515,612 B2
(45) Date of Patent: Aug. 20, 2013

(54) ROUTE PLANNING METHOD, ROUTE PLANNING DEVICE AND AUTONOMOUS MOBILE DEVICE

(75) Inventors: Shoji Tanaka, Kyoto (JP); Hideo Shitamoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 173 days.

(21) Appl. No.: 13/061,945

(22) PCT Filed: Aug. 24, 2009

(86) PCT No.: PCT/JP2009/004052
§ 371 (c)(1),
(2), (4) Date: Mar. 2, 2011

(87) PCT Pub. No.: WO2010/026710
PCT Pub. Date: Mar. 11, 2010

(65) Prior Publication Data
US 2011/0166737 A1 Jul. 7, 2011

(30) Foreign Application Priority Data

Sep. 3, 2008 (JP) ................................ 2008-225881
Sep. 4, 2008 (JP) ................................ 2008-227008
Sep. 9, 2008 (JP) ................................ 2008-231519

(51) Int. Cl.
*G01C 22/00* (2006.01)
*G05D 1/00* (2006.01)
*G01C 21/00* (2006.01)
*G06F 19/00* (2011.01)
*G05B 19/04* (2006.01)
*G05B 19/18* (2006.01)

(52) U.S. Cl.
USPC ................. 701/25; 701/23; 701/26; 701/400; 701/408; 701/435; 700/245; 700/252; 700/253; 700/255

(58) Field of Classification Search
USPC ............... 701/23, 25, 26, 400, 408, 409, 410, 701/411, 435; 700/245, 252, 253, 255
See application file for complete search history.

(56) References Cited

U.S. PATENT DOCUMENTS 5,502,638 A 3/1996 Takenaka
5,657,225 A * 8/1997 Bauer ............................. 701/23
(Continued)

FOREIGN PATENT DOCUMENTS

DE 693 20 670 T2 1/1999
EP 0 556 031 A2 2/1993
(Continued)

OTHER PUBLICATIONS

Official Communication issued in corresponding International Application PCT/JP2009/004052, mailed on Nov. 17, 2009.
(Continued)

*Primary Examiner* — Khoi Tran
*Assistant Examiner* — Nicholas Kiswanto
(74) *Attorney, Agent, or Firm* — Keating & Bennett, LLP

(57) ABSTRACT

A route planning device that is capable of comprehending, in advance, a route clearance at a pass-through point on a planned travel route, includes a global map acquisition unit arranged to generate a global map showing an obstacle area in which an obstacle exists, an extended area generation unit arranged to generate an extended obstacle area and three extended area by extending stepwise an outline of the obstacle area contained in the global map, an integrated map generation unit arranged to generate an integrated map by superposing for integration of the extended obstacle area with the three extended areas; a movable area extraction unit arranged to extract a movable area from the integrated map and thinning the same, and a route planning unit arranged to acquire a route clearance at a sub goal according to the extended areas on the integrated map to which the sub goal on the travel route belongs, upon planning the travel route from the thinned movable area.

3 Claims, 28 Drawing Sheets

(56) References Cited

U.S. PATENT DOCUMENTS

| | | | |
|---|---|---|---|
| 5,987,379 A * | 11/1999 | Smith | 701/468 |
| 6,240,342 B1 * | 5/2001 | Fiegert et al. | 701/25 |
| 7,957,858 B1 * | 6/2011 | Larson et al. | 701/23 |
| 2002/0143461 A1 * | 10/2002 | Burns et al. | 701/117 |
| 2006/0058921 A1 | 3/2006 | Okamoto | |
| 2006/0224304 A1 * | 10/2006 | Hudson et al. | 701/202 |
| 2006/0241827 A1 | 10/2006 | Fukuchi et al. | |
| 2006/0293792 A1 | 12/2006 | Hasegawa et al. | |

FOREIGN PATENT DOCUMENTS

| | | |
|---|---|---|
| EP | 1 734 433 A2 | 12/2006 |
| JP | 63-200208 A | 8/1988 |
| JP | 5-250023 A | 9/1993 |
| JP | 05-297937 A | 11/1993 |
| JP | 7-129238 A | 5/1995 |
| JP | 2005-293154 A | 10/2005 |
| JP | 2005-309990 A | 11/2005 |
| JP | 2006-107475 A | 4/2006 |
| JP | 2006-239844 A | 9/2006 |
| JP | 2006-350776 A | 12/2006 |
| JP | 2007-213111 A | 8/2007 |
| JP | 2008-065755 A | 3/2008 |
| JP | 2008-152380 A | 7/2008 |

OTHER PUBLICATIONS

Official Communication issued in International Patent Application No. PCT/JP2009/004052, mailed on Nov. 17, 2009.

Official Communication issued in corresponding Japanese Patent Application No. 2008-225881, mailed on Sep. 11, 2012.

Official Communication issued in corresponding Japanese Patent Application No. 2008-227008, mailed on Sep. 11, 2012.

Official Communication issued in corresponding Japanese Patent Application No. 2008-231519, mailed on Sep. 11, 2012.

* cited by examiner

ROUTE PLANNING METHOD, ROUTE PLANNING DEVICE AND AUTONOMOUS MOBILE DEVICE

BACKGROUND OF THE INVENTION

1. Field of the Invention

The present invention relates to a route planning method and a route planning device for planning a travel route, and an autonomous mobile device.

2. Description of the Related Art

A conventional autonomous mobile device autonomously travels from the starting point (starting position) to the destination (goal position) along a planned route while avoiding contact with obstacles. As this kind of autonomous mobile device, a mobile robot (autonomous mobile device) which autonomously controls the travel speed and travel direction according to ambient environmental conditions (ambient brightness and the like, for example) is disclosed in Japanese Patent Application Laid-open No. 2007-213111. This mobile robot travels at a fast speed if the ambient environmental conditions are favorable, and drops its travel speed if the ambient environmental conditions are inferior in order to avoid contact with obstacles.

Meanwhile, when planning an autonomous travel route, for example, SLAM (Simultaneous Localization and Mapping) technology or the like is used to generate an environmental map (map showing an area containing obstacles and an area that does not contain obstacles) in which an xy plane is subject to grid division, a movable area is extracted from the environmental map, and the starting position and goal position instructed by the user are connected along the movable area in order to plan the travel route.

Upon extracting a movable area from the environmental map, a method of extending (expanding) the boundary of the obstacle area in an amount corresponding to the size of the autonomous mobile device so that the size of the autonomous mobile device can be viewed as a point, is used. As this kind of method of extending the boundary of the obstacle area, a method using a potential function is described in Japanese Patent Application Laid-open No. H7-129238. According to the method described in Japanese Patent Application Laid-open No. H7-129238, foremost, a potential function having a certain potential value in the obstacle area and which monotonically decreases according to the distance from the obstacle area is considered, and a potential field in which the sum of the value calculated with the potential function relative to the respective grids of the movable area as the potential value of that location is created. Subsequently, by using this potential field, an area in which the potential value becomes a predetermined threshold or more is added as a new obstacle area to the original obstacle area.

Moreover, an area in which the potential value becomes less than a predetermined threshold is deemed a new movable area.

More specifically, with this route generation method, the travel route is generated according to the following routine.

1. A topographic map is generated with topographic data obtained as a result of the distance measurement using a laser range finder.

2. A potential field is generated so that an obstacle area becomes a ridge and a travelable area becomes a valley relative to the generated topographic map. An area in which the potential value becomes a predetermined value or greater, is redefined as an obstacle area. An area in which the potential value becomes less than a predetermined value is redefined as a travelable area.

3. The overall travelable area is divided into partial areas that are represented as an aggregate of intervals of other directions which are different from the reference direction that corresponds one-on-one to the respective coordinates of the reference direction as a result of dividing the travelable area at the branching or connecting points of the travelable area relative to the reference direction, and expressing the result as a graph structure with the partial areas as the node and the connection relation between the partial area as the arc.

4. The route length of the polygonal route connecting the starting point, the pass points selected theretofore, and the goal point is considered as the distance predictive value. The halfway passage area sequence and the pass point sequence of the route from the starting point to the goal point are searched and decided based on the graph structure so as to minimize the route length.

5. The collision check of the polygonal route connecting the pass points and the obstacle area is performed using the interval information of the nodes of the graph structure, and a polygonal route that will not collide with the obstacle area is generated by adding, to the polygonal apex sequence, the boundary point sequence corresponding to the portion that will collide with the obstacle area on the polygonal route or the point sequence with an appropriate offset provided thereto.

Here, the control cycle and the control delay cannot be set to zero upon performing the travel control of the autonomous mobile device. Thus, the actual behavior of an autonomous mobile device is subject to a slight error (response lag) relative to the intended behavior. Note that this error becomes more prominent as the travel speed increases. Meanwhile, the clearance (width of passage) of the route on which the autonomous mobile device travels is not always constant. Thus, with the mobile robot described in Japanese Patent Application Laid-open No. 2007-213111, in cases where the autonomous mobile device passes through, for example, a narrow passage (route) or avoids an obstacle in a narrow passage, there was a possibility that it would come in contact with the obstacle due to the influence of the foregoing error. Accordingly, under circumstances where it is only known that the autonomous mobile device can pass through the pass-through point on the route, it was necessary to travel at a slow speed in order to reduce the foregoing error regardless of whether the passage (route) was sufficiently wide or narrow.

According to the foregoing route generation method, the route is planned by determining that it can be passed through if the potential value is less than a predetermined threshold, but no consideration is given to comprehending, in advance, the clearance (width of passage) of the planned route. Specifically, although the route clearance at the pass-through points on the travel route is often different for each pass-through point, with the foregoing route generation method, it was not possible to comprehend, in advance, the route clearance of each pass-through point on the planned travel route. Thus, in consideration of the control cycle and control delay, it was necessary to travel at a slow speed even at locations where the route has clearance in the same manner upon traveling on a route with no clearance.

Moreover, according to the foregoing route generation method, it is possible to generate a polygonal route that does not collide with the obstacle area. Nevertheless, with this method, since a polygonal route that will not collide with the obstacle area is generated by adding, to the polygonal apex sequence, the boundary point sequence corresponding to the portion that will collide with the obstacle area on the polygonal route or the point sequence with an appropriate offset provided thereto, depending on the shape of the obstacle area, there is a possibility that a polygonal route of a complex shape (for example a zigzag route, a route with sharp bends, and so on) may be generated. Thus, there was a possibility that the generated travel route would not necessarily be a shape that is suitable for the travel of the autonomous mobile device from the perspective of the motion performance (motion characteristics) of the autonomous mobile device. Specifically, cases where the autonomous mobile device could not actually travel along the generated polygonal route, or would vibrate upon traveling along the generated polygonal route may have occurred.

SUMMARY OF THE INVENTION

In view of the foregoing problems, preferred embodiments of the present invention provide a route planning method, a route planning device, and an autonomous mobile device including a route planning device that is capable of comprehending, in advance, a route clearance of a pass-through point on a planned travel route.

Moreover, other preferred embodiments of the present invention provide a route planning device that is capable of planning a travel route on which an autonomous mobile device which travels along a travel route can travel more smoothly, and an autonomous mobile device including such a route planning device.

In addition, yet another preferred embodiment of the present invention provides an autonomous mobile device capable of performing appropriate travel control according to a route clearance of a travel route.

A route planning method according to a preferred embodiment of the present invention includes an environmental map acquisition step of acquiring an environmental map showing an obstacle area in which an obstacle exists, an extended area generation step of generating a plurality of extended areas by extending stepwise an outline of the obstacle area contained in the environmental map acquired in the environmental map acquisition step, an integrated map generation step of generating an integrated map by superposing and integrating the plurality of extended areas generated in the extended area generation step, a movable area extraction step of extracting a movable area from the integrated map generated in the integrated map generation step, and a route planning step of planning a travel route from the movable area extracted in the movable area extraction step and acquiring a route clearance at a pass-through point according to an extended area on the integrated map to which the pass-through point on the travel route belongs.

Moreover, the route planning device according to another preferred embodiment of the present invention includes an environmental map acquisition unit arranged to acquire an environmental map showing an obstacle area in which an obstacle exists, an extended area generation unit arranged to generate a plurality of extended areas by extending stepwise an outline of the obstacle area contained in the environmental map acquired by the environmental map acquisition unit, an integrated map generation unit arranged to generate an integrated map by superposing and integrating the plurality of extended areas generated by the extended area generation unit, a movable area extraction unit arranged to extract a movable area from the integrated map generated by the integrated map generation unit, and a route planning unit arranged to plan a travel route from the movable area extracted by the movable area extraction unit and acquire a route clearance at a pass-through point according to an extended area on the integrated map to which the pass-through point on the travel route belongs.

According to the route planning method and the route planning device of various preferred embodiments of the present invention, the plurality of extended areas generated as a result of the outline of the obstacle area being extended stepwise are superposed and integrated, and the integrated map is thereby generated. Specifically, the boundary (outline) of the respective extended areas on the integrated map is disposed according to the distance from the obstacle area. Thus, upon planning the travel route to pass through a movable area extracted from the integrated map, it is possible to comprehend the route clearance of the pass-through point from the extended area on the integrated map to which the pass-through point on the travel route belongs. Accordingly, it is possible to comprehend, in advance (at the route planning stage), the route clearance of the pass-through point on the planned travel route. Moreover, since it is possible to comprehend the route clearance from the extended area to which the pass-through point belongs, the route clearance of the pass-through point can be recognized with lesser amount of operation.

Preferably, the route planning method according to a preferred embodiment of the present invention is a route planning method of planning a travel route used by an autonomous mobile device which travels along the travel route, and, in the foregoing extended area generation step, the outline of the obstacle area is extended in an amount corresponding to a radius of the autonomous mobile device, and the outline of the extended obstacle area is additionally extended stepwise in a predetermined range of extension.

Moreover, preferably, the route planning device according to a preferred embodiment of the present invention is a route planning device for planning a travel route used by an autonomous mobile device which travels along the travel route, and, the extended area generation unit extends the outline of the obstacle area in an amount corresponding to a radius of the autonomous mobile device, and additionally extends stepwise the outline of the extended obstacle area in a predetermined range of extension.

In the foregoing case, since the outline of the obstacle area is foremost extended in an amount corresponding to the radius of the autonomous mobile device, the size of the autonomous mobile device relative to the outline of the extended obstacle area can be viewed as a point upon extracting the movable area. Moreover, since the outline of the extended obstacle area is further extended in a predetermined range of extension, the route clearance of the pass-through point on the travel route can be comprehended, with the foregoing range of extension as a unit, as a multiple of the range of extension.

With the route planning method according to a preferred embodiment of the present invention, preferably, the foregoing predetermined range of extension is the radius of the autonomous mobile device. Moreover, with the autonomous mobile device according to a preferred embodiment of the present invention, preferably, the foregoing predetermined range of extension is the radius of the autonomous mobile device.

In the foregoing case, since the outline of the extended obstacle area is extended stepwise in an amount corresponding to each radius of the autonomous mobile device, the route clearance of the pass-through point on the travel route can be comprehended as a multiple of the radius of the autonomous mobile device. Moreover, by unifying the range of extension with the radius of the autonomous mobile device, the operation load of the control device can be reduced.

An autonomous mobile device according to a preferred embodiment of the present invention is an autonomous mobile device which travels along a planned travel route in an ambient environment, and includes any one of the foregoing route planning devices.

Since the autonomous mobile device of a preferred embodiment of the present invention includes any one of the foregoing route planning devices, the route clearance of each pass-through point can be comprehended in advance. Accordingly, for example, an appropriate travel speed according to the route clearance of each pass-through point can be set in advance for each pass-through point.

The route planning device according to a preferred embodiment of the present invention includes an environmental map acquisition unit arranged to acquire an environmental map showing an obstacle area in which an obstacle exists, a movable area extraction unit arranged to extract a movable area from the environmental map acquired by the environmental map acquisition unit, a route planning unit arranged to plan a travel route from the movable area extracted by the movable area extraction unit, and a linearization unit arranged to linearize the travel route planned with the route planning unit without interfering with the obstacle area.

According to the route planning device of a preferred embodiment of the present invention, the travel route that was planned to pass through the movable area extracted from the environmental map is linearized without interfering with the obstacle area. Thus, for example, even in cases where a zigzag travel route is planned by the route planning unit, the travel route can be linearized within a range that it will not come in contact with an obstacle. Consequently, it is possible to plan a travel route on which an autonomous mobile device which travels along a travel route can travel more smoothly.

With the route planning device according to a preferred embodiment of the present invention, preferably, the linearization unit extracts two points on the travel route, connects the two points with a straight line, and, when the connected straight line does not interfere with the obstacle area, re-sets the straight line as a travel route which connects the two points.

In the foregoing case, if the straight line connecting the two points on the extracted travel route does not interfere with the obstacle area, the straight line connecting the two points is re-set as the travel route. Thus, the travel route can be linearized appropriately and reliably without interfering with the obstacle area.

Moreover, when the straight line connecting the two points does not interfere with the obstacle area, preferably, the foregoing linearization unit fixes one point of the two points, and sequentially changes the other point of the two points to a point that is more distant from the one point until the straight line connecting the two points interferes with the obstacle area.

According to the foregoing configuration, the travel route can be linearized to a greater degree within a range that it will not interfere with the obstacle area.

In addition, preferably, the linearization unit linearizes the travel route repeatedly from one end point to the other end point of the travel route.

According to the foregoing configuration, the entire travel route can be linearized from one end point (starting point, for example) to the other end point (goal point, for example) of the travel route.

The route planning device according to a preferred embodiment of the present invention includes an environmental map acquisition unit arranged to acquire an environmental map showing an obstacle area in which an obstacle exists, a movable area extraction unit arranged to extract a movable area from the environmental map acquired by the environmental map acquisition unit, a route planning unit arranged to plan a travel route from the movable area extracted by the movable area extraction unit, and a smoothing unit arranged to smooth the travel route planned with the route planning unit without interfering with the obstacle area.

According to the route planning device of a preferred embodiment of the present invention, the travel route that was planned to pass through the movable area extracted with the environmental map is smoothed without interfering with the obstacle area. Thus, for example, even in cases where a travel route with a sharp angle is planned by the route planning unit, the travel route can be smoothed within a range that it will not come in contact with an obstacle. Consequently, it is possible to plan a travel route on which an autonomous mobile device which travels along a travel route can travel more smoothly.

With the route planning device according to a preferred embodiment of the present invention, preferably, the smoothing unit extracts a point on the travel route and two points on the travel route sandwiching the point, connects the two points with a straight line, and, when the connected straight line does not interfere with the obstacle area, re-sets the straight line as a travel route which connects the two points.

According to the foregoing configuration, when the straight line connecting the two points sandwiching the point on the extracted travel route does not interfere with the obstacle area, the straight line connecting the two points is re-set as the travel route. Thus, the travel route can be smoothed appropriately and reliably without interfering with the obstacle area.

Moreover, if the straight line connecting the two points does not interfere with the obstacle area, preferably, the smoothing unit fixes the point sandwiched by the two points, and sequentially changes each of the two points to a point that is more distant from the point until the straight line connecting the two points interferes with the obstacle area.

According to the foregoing configuration, the travel route can be smoothed to a greater degree within a range that it will not interfere with the obstacle area.

In addition, preferably, the smoothing unit smoothes the travel route, repeatedly, from one end point to the other end point of the travel route.

According to the foregoing configuration, the entire travel route can be smoothed from one end point (starting point, for example) to the other end point (goal point, for example) of the travel route.

Preferably, the route planning device according to a preferred embodiment of the present invention further includes a smoothing unit arranged to smoothe the travel route linearized by the foregoing linearization unit without interfering with the obstacle area.

In the foregoing case, since the travel route is linearized and additionally smoothed thereafter, the travel route can be simplified even further. Thus, for example, even in cases where the travel route is planned with complicated bends by the route planning unit, the travel route can be simplified within a range that it will not come in contact with an obstacle. Consequently, it is possible to plan a travel route on which an autonomous mobile device which travels along a travel route can travel more smoothly.

With the route planning device according to a preferred embodiment of the present invention, preferably, the smoothing unit extracts a point on the linearized travel route and two points on the linearized travel route sandwiching the point, connects the two points with a straight line, and, when the connected straight line does not interfere with the obstacle area, re-sets the straight line as a travel route which connects the two points.

In the foregoing case, if the straight line connecting the two points sandwiching the point on the linearized travel route does not interfere with the obstacle area, the straight line connecting the two points is re-set as the travel route. Thus, the linearized travel route can be smoothed appropriately and reliably without interfering with the obstacle area.

The autonomous mobile device according to a preferred embodiment of the present invention is an autonomous mobile device which travels along a planned travel route in an ambient environment, and includes any one of the foregoing route planning devices.

Since the autonomous mobile device of a preferred embodiment of the present invention includes any one of the foregoing route planning devices, it is possible to acquire a travel route that was linearized and/or smoothed without interfering with the obstacle; specifically, the travel route with a shape of being more appropriate for the travel of the autonomous mobile device. Consequently, the autonomous mobile device can travel more smoothly upon traveling along the travel route planned with the autonomous mobile device.

The autonomous mobile device according to a preferred embodiment of the present invention includes an environmental map acquisition unit arranged to acquire an environmental map showing an obstacle area in which an obstacle exists, a route planning unit arranged to plan a travel route from the environmental map acquired by the environmental map acquisition unit, a route clearance acquisition unit arranged to acquire a route clearance of the travel route planned by the route planning unit, a moving unit arranged to move a autonomous mobile device, a self location detector arranged to detect a self location, and a travel controller programmed and arranged to acquire the route clearance at the self location obtained from the self location detected by the self location detector and the route clearance acquired by the route clearance acquisition unit, and control the moving unit according to the route clearance at the self location.

According to the autonomous mobile device of a preferred embodiment of the present invention, a travel route is planned from the acquired environmental map, and a route clearance of the travel route is acquired. Meanwhile, the route clearance at the self location is comprehended from the detected self location and the acquired route clearance of the travel route. The moving unit is controlled according to the comprehended route clearance at the self location. Thus, the appropriate travel control can be performed according to the route clearance at the travel point (self location) upon traveling along the travel route.

Preferably, the autonomous mobile device according to a preferred embodiment of the present invention further includes a storage device arranged to store the travel route planned by the route planning unit and the route clearance acquired by the route clearance acquisition unit, and the travel controller acquires the route clearance at the self location obtained from the self location detected by the self location detector and the route clearance stored in the storage device.

In the foregoing case, the travel route and the route clearance of the travel route are acquired and stored in advance. Thus, since it is no longer necessary to obtain the route clearance of the travel route while the autonomous mobile device is traveling, it is possible to reduce the operation load and reduce the control delay while the autonomous mobile device is traveling.

With the autonomous mobile device according to a preferred embodiment of the present invention, preferably, the travel controller sets a travel speed of the autonomous mobile device according to the route clearance at the self location, and controls the moving unit based on the travel speed.

According to the foregoing configuration, the travel speed can be adjusted according to the route clearance of the travel point. Thus, it is possible to travel at an appropriate travel speed according to the route clearance of the travel point. Accordingly, for example, it is possible to travel slowly in a narrow passage, and, contrarily, travel at a faster speed in a wide passage.

Moreover, with the autonomous mobile device according to a preferred embodiment of the present invention, preferably, the travel controller includes an obstacle avoidance controller programmed and arranged to set an avoidance force to avoid an obstacle according to the route clearance at the self location, and controls the moving unit based on the avoidance force set by the obstacle avoidance controller.

According to the foregoing configuration, the avoidance force for avoiding obstacles can be adjusted according to the route clearance of the travel point. Thus, for example, it is possible to slowly and narrowly avoid the obstacle in a narrow passage, and, contrarily, quickly avoid, with considerable clearance, the obstacle in a wide passage.

According to various preferred embodiments of the present invention, since the configuration is such that a plurality of extended areas are generated by extending an outline of an obstacle area stepwise, and a route clearance at a pass-through point is acquired according to the extended area to which the pass-through point on the travel route belongs upon planning the travel route, the route clearance of the pass-through point on the planned travel route can be comprehended in advance.

Moreover, according to various preferred embodiments of the present invention, it is possible to plan a travel route on which an autonomous mobile device which travels along a travel route can travel more smoothly.

In addition, according to various preferred embodiments of the present invention, since the configuration is such that a route clearance at the self location is acquired, and the moving unit is controlled according to the route clearance at the self location, it is possible to perform appropriate travel control according to the route clearance of the travel route.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
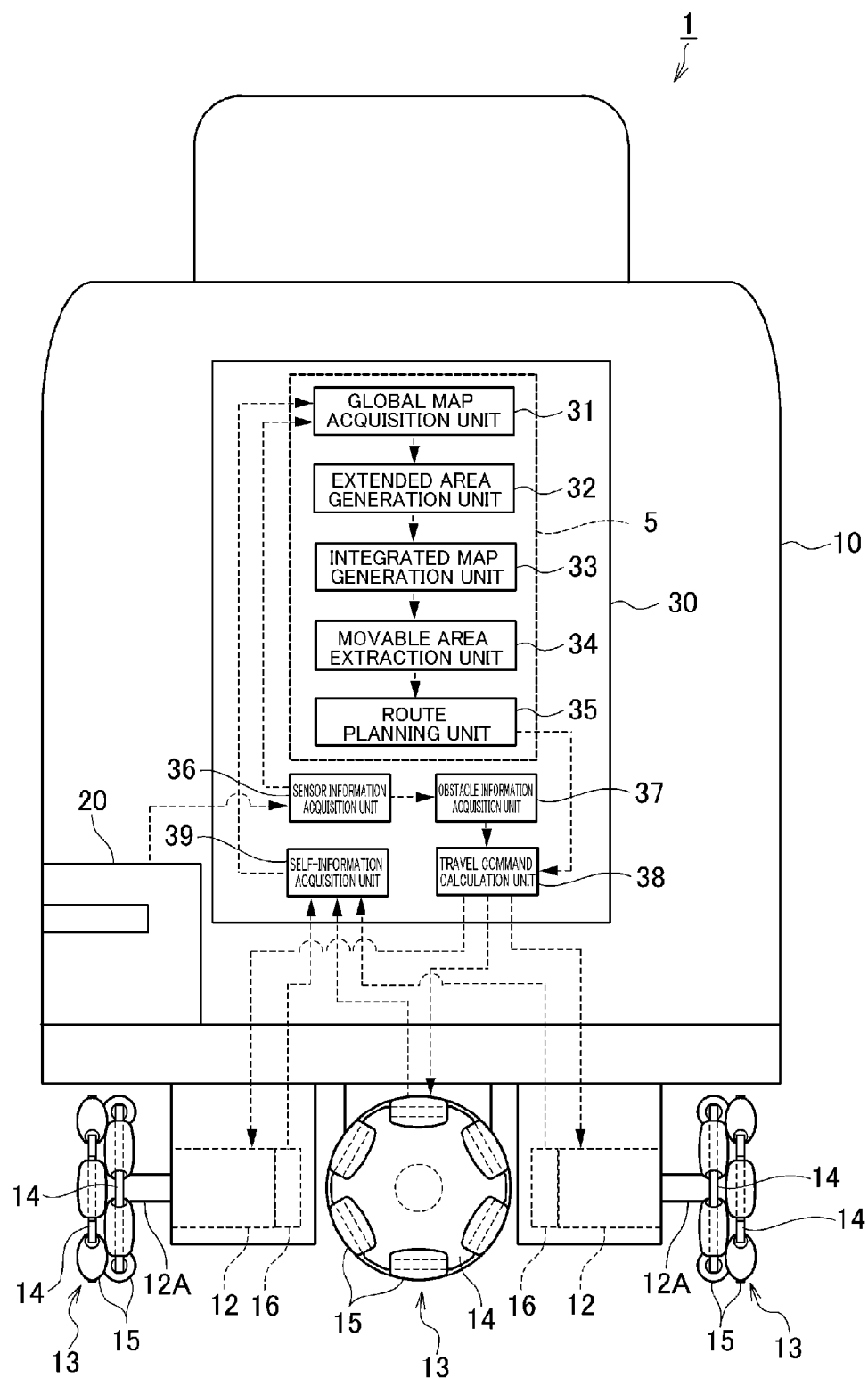
FIG. 1 is a block diagram showing the configuration of the autonomous mobile device mounted with the route planning device according to a first preferred embodiment of the present invention.

Preferred embodiments of the present invention will now be explained in detail with reference to the appended drawings. Note that, in the respective drawings, the same elements are given the same reference numerals and redundant explanations are omitted.
[First Preferred Embodiment]
The configuration of a route planning device 5 and an autonomous mobile device 1 mounted with the foregoing route planning device 5 according to the first preferred embodiment is foremost explained with reference to FIG. 1.

FIG. 1 is a functional block diagram showing the configuration of the autonomous mobile device 1 mounted with the route planning device 5.

The autonomous mobile device 1 performs the functions of acquiring an ambient environmental map (map showing an area containing obstacles and an area that does not contain obstacles; hereinafter referred to as the "global map"), planning a travel route which connects the starting point (starting position) and the destination (goal position) on the global map, and autonomously traveling from the starting position to the goal position along the planned route. Note that the starting position and the goal position are given by the user. Thus, the autonomous mobile device 1 preferably includes a main body 10 provided with an electric motor 12 at the lower portion thereof and an omni wheel 13 that is driven with the electric motor 12, and a laser range finder 20 to measure the distance to the obstacles existing in the periphery. Moreover, the autonomous mobile device 1 preferably includes an electronic controller 30 which includes a route planning device 5 to plan the travel route, and which controls the electric motor 12 so that the autonomous mobile device 1 travels along the planned route. Each of the constituent elements is described in detail below.

The main body 10 is a metal frame formed, for example, in an approximate cylindrical bottomed shape, and the main body is mounted with the laser range finder 20, the electronic controller 30 including the route planning device 5, and so on. Note that the shape of the main body 10 is not limited to an approximate cylindrical bottomed shape. At the lower portion of the main body 10, four electric motors 12 are preferably provided and arranged to define a cross shape. An omni wheel 13 is mounted to a drive shaft 12A of each of the four electric motors 12. Specifically, the four omni wheels 13 are mounted by being spaced at 90° intervals along the circumferential direction in a concyclic manner.

The omni wheel 13 is a wheel including two wheels 14 that rotate around the drive shaft 12A of the electric motor 12, and six free rollers 15 provided rotatably around a shaft that is orthogonal to the drive shaft 12A of the electric motor 12 at the outer circumference of the respective wheels 14, and is able to move omnidirectionally. Note that the two wheels 14 are mounted by shifting the phase by 30°. Based on this configuration, when the electric motor 12 is driven and the wheel 14 is rotated, the six free rollers 15 rotate integrally with the wheels 14. Meanwhile, as a result of the grounded free rollers 15 rotating, the omni wheel 13 can also move in a direction that is parallel with the rotating shaft of that wheel 14. Thus, by independently controlling the four electric motors 12 and independently adjusting the rotating direction and rotating speed of the respective four omni wheels 13, the autonomous mobile device 1 can be moved in an arbitrary direction (omnidirectionally).

The drive shaft 12A of each of the four electric motors 12 is mounted with an encoder 16 to detect the angle of rotation of the drive shaft 12A. Each encoder 16 is connected to the electronic controller 30, and outputs the detected angle of rotation of the respective electric motors 12 to the electronic controller 30. The electronic controller 30 computes the travel distance of the autonomous mobile device 1 from the angle of rotation of the respective electric motors 12 that was input.

The laser range finder 20 is mounted on the front portion of the autonomous mobile device 1 so as to face the front (forward) direction of the autonomous mobile device 1. The laser range finder 20 scans the circumference of the autonomous mobile device 1 in a fan-like manner in the horizontal direction with a central angle of 240° by emitting a laser and reflecting the emitted laser with a rotating mirror. Subsequently, the laser range finder 20 detects the laser that was returned by reflecting off an object such as a wall or an obstacle, and detects the angle formed with and the distance to the object by measuring the detection angle of the laser (reflected wave) and the time (propagation time) from the emission of the laser to the return thereof upon being reflected off an object. Note that the laser range finder 20 is connected to the electronic controller 30, and outputs, to the electronic controller 30, the detected distance information and angle information relative to the peripheral object.

The electronic controller 30 governs the overall control of the autonomous mobile device 1. The electronic controller 30 preferably includes a microprocessor that performs operations, a ROM that stores programs and the like for causing the microprocessor to execute the respective processes, a RAM that temporarily stores various types of data such as operation results and the like, and a backup RAM that retains stored contents. Moreover, the electronic controller 30 preferably includes an interface circuit arranged to electrically connect the laser range finder 20 and the microprocessor, a motor driver arranged to drive the electric motor 12, and so on.

The electronic controller 30 includes the route planning device 5 which plans the travel route and acquires the route clearance of the travel route, and plans the travel route as well as controls the electric motor 12 so that the autonomous mobile device 1 travels along the planned route. The route planning device 5 configuring the electronic controller 30 includes a global map acquisition unit 31, an extended area generation unit 32, an integrated map generation unit 33, a movable area extraction unit 34, and a route planning unit 35 arranged to plan the travel route and acquire the route clearance of the travel route. Moreover, the electronic controller 30 additionally includes a sensor information acquisition unit 36, an obstacle information acquisition unit 37, a travel command calculation unit 38, and a self-information acquisition unit 39. Note that each of the foregoing components is preferably configured by combining the foregoing hardware and software.

The global map acquisition unit 31 uses, for example, SLAM technology or the like to generate a global map showing an area containing obstacle (obstacle area) and an area that does not contain obstacles. Here, a global map is a map that is configured from a plane in which a horizontal plane is divided into blocks of a predetermined size (for example, 1 cm in height and width), and a grid containing an obstacle is given, for example, a value that is greater than "0" and a grid that does not contain an obstacle is given a value that is less than "0". When generating a global map using the SLAM technology, foremost, the global map acquisition unit 31 generates a local map based on the distance information and angle information relative to the peripheral object that are read from the laser range finder 20 via the sensor information acquisition unit 36. Moreover, the global map acquisition unit 31 acquires the self location from the self-information acquisition unit 39. Note that the self-information acquisition unit 39 verifies the local map and global map in consideration of the calculated travel distance of the autonomous mobile device 1 according to the angle of rotation of the respective electric motors 12 read from the encoder 16, and estimates the self location based on the verification results. Subsequently, the global map acquisition unit 31 projects the local map on the global map by performing coordinate transformation to the local map in which the laser range finder serves as the original point, with the self location being adjusted from the coordinate system in which the laser range finder 20 serves as the original point to the coordinate system of the global map. The global map acquisition unit 31 repeatedly executes this processing while traveling, and generates a global map of the entire ambient environment by sequentially appending (adding) the local map to the global map.

Figure 3:
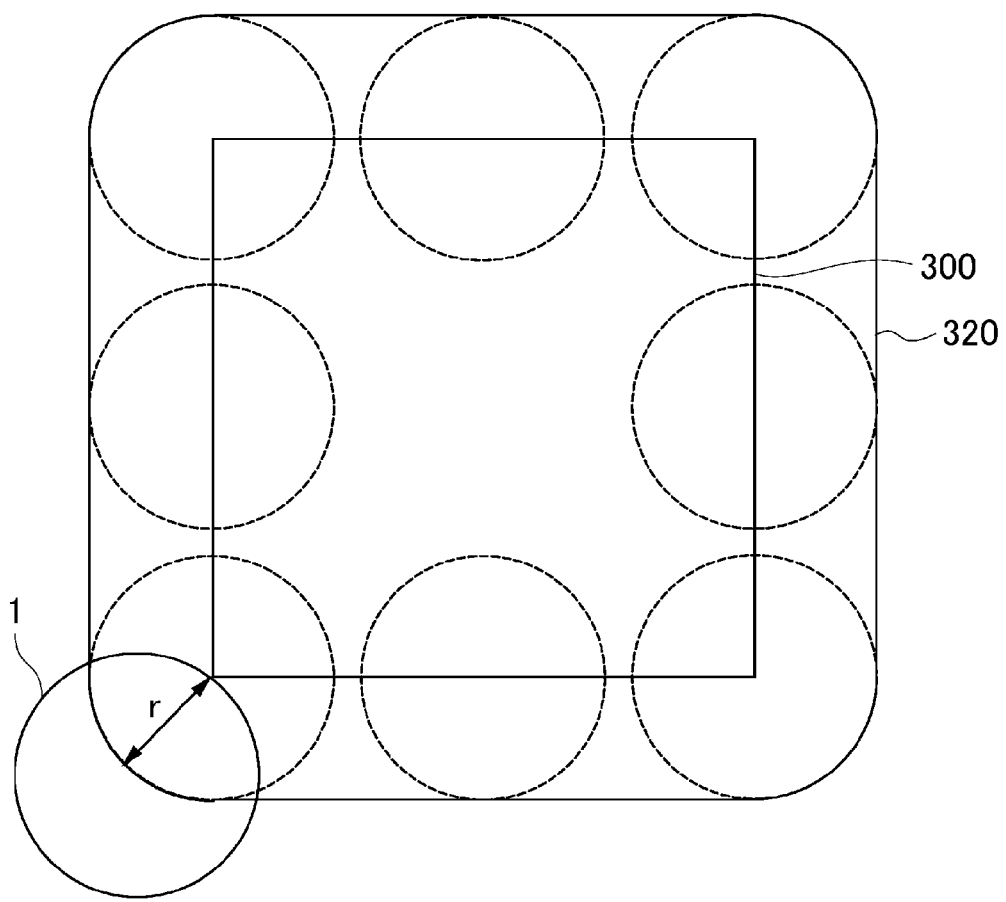
FIG. 3 is a diagram explaining the method of extending the obstacle area (Minkowski sum operation).

The extended area generation unit 32 extends an outline of the obstacle area contained in the global map generated with the global map acquisition unit 31 in an amount corresponding to a radius of the autonomous mobile device 1 to generate an obstacle area that is extended (hereinafter also referred to as the "extended obstacle area"), and additionally extends stepwise an outline of the extended obstacle area in a predetermined range of extension to generate a plurality of extended areas. For the generation of an extended area, for example, the well known Minkowski sum can be used. Specifically, as shown in FIG. 3, the extended obstacle area 320 is generated by extending the outline (boundary) of the obstacle area 300 in an amount corresponding to the radius r of the autonomous mobile device 1. Based on this processing, the size of the autonomous mobile device 1 can be deemed a point relative to the extended obstacle area 320. In addition, the extended area generation unit 32 extends, in three stages, the outline of each extended obstacle area 320 in each predetermined range of extension to generate three extended areas; specifically, a first extended area 321, a second extended area 322, and a third extended area 323 (refer to FIG. 4). Note that, in this preferred embodiment, the radius r of the autonomous mobile device 1 was preferably used as the predetermined range of extension, for example. Specifically, the extended area generation unit 32 generates the first extended area 321 by extending the outline of the extended obstacle area 320 in an amount corresponding to the radius r of the autonomous mobile device 1, generates the second extended area 322 by extending the outline of the first extended area 321 in an amount corresponding to the radius r, and generates the third extended area 323 by extending the outline of the second extended area 322 in an amount corresponding to the radius r.

Figure 4:
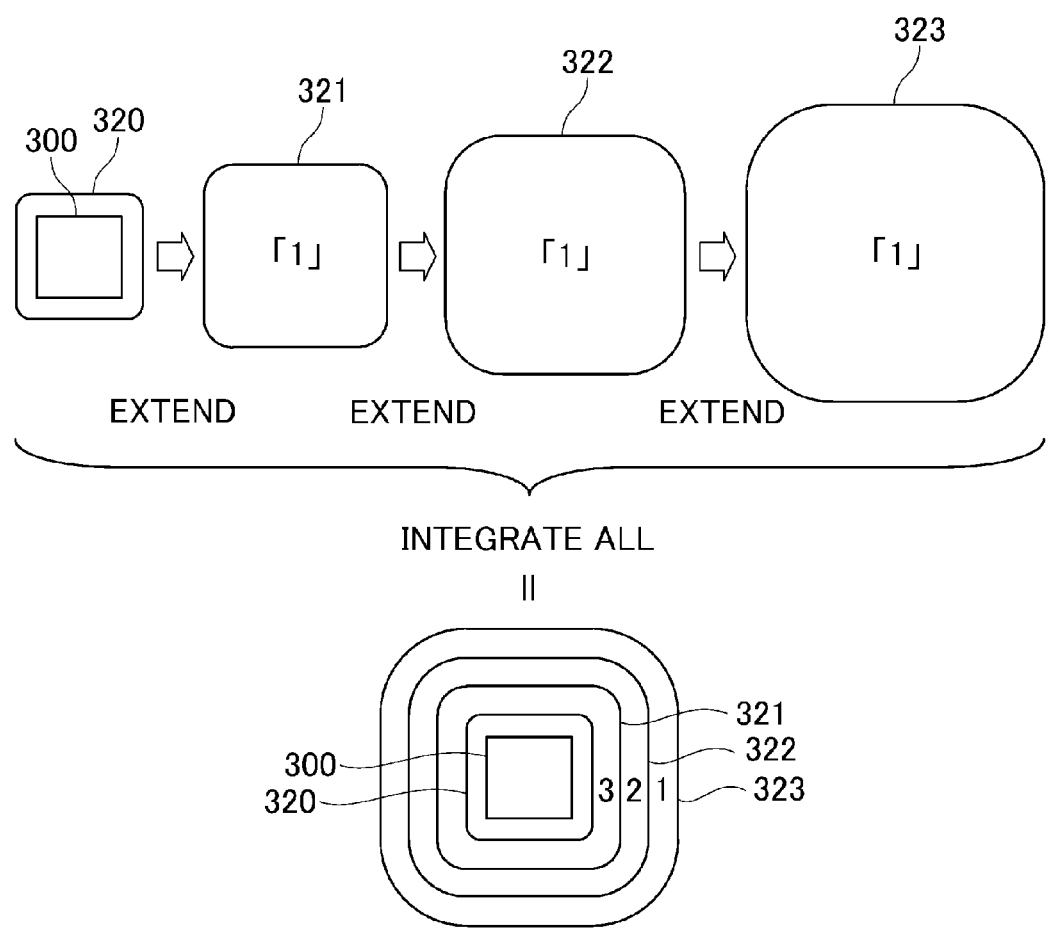
FIG. 4 is a diagram explaining the method of generating an integrated map.

The integrated map generation unit 33 generates an integrated map by superposing and integrating the plurality of extended areas generated with the extended area generation unit 32 (in this preferred embodiment, the extended obstacle area 320, the first extended area 321, the second extended area 322, and the third extended area 323). More specifically, as shown in FIG. 4, the integrated map is generated by superposing and integrating the extended obstacle area 320 and the respective extended areas 321 to 323 after giving, for example, a value (weight) of "1" to all grids respectively contained in the extended obstacle area 320, the first extended area 321, the second extended area 322, and the third extended area 323. Specifically, the integrated value (weight) of the area where the first extended area 321, the second extended area 322 and the third extended area 323 overlap in the integrated map is "3". Similarly, the integrated value (weight) of an area where only the second extended area 322 and the third extended area 323 overlap (area in which the first extended area 321 is excluded from the second extended area 322) is "2". Moreover, the value (weight) of an area only containing the third extended area 323 (area in which the second extended area 322 is excluded from the third extended area 323) is "1". Thus, the integrated value of the respective areas (respective grids) on the integrated map represents a value corresponding to the distance from the extended obstacle area 320 (that is, the obstacle) with the radius r of the autonomous mobile device 1 as a unit, and is represented as being closer to an obstacle in an area (grid) with a greater integrated value, and, contrarily, as being distant from an obstacle in an area (grid) with a smaller integrated value. Accordingly, the distance (route clearance) to the obstacle can be comprehended from the integrated value of the respective areas (respective grids) on the integrated map.

Figure 5:
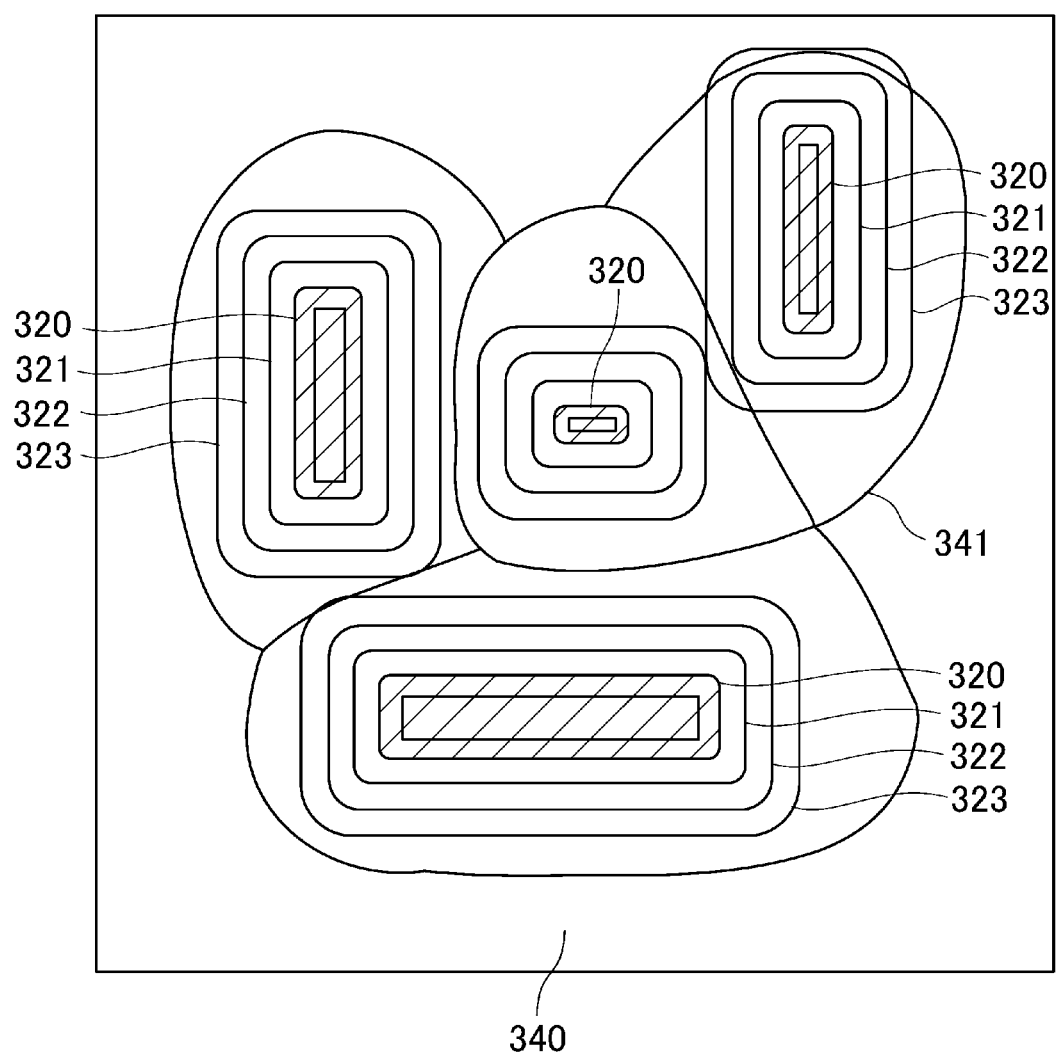
FIG. 5 is a diagram explaining the method of extracting and method of thinning the movable area.

The movable area extraction unit 34 extracts, from the integrated map generated with the integrated map generation unit 33, an area (movable area) where the autonomous mobile device 1 can travel without coming in contact with an obstacle. As shown in FIG. 5, in this preferred embodiment, an area other than the extended obstacle area 320 (area excluding the shaded area in FIG. 5) on the integrated map is extracted as the movable area 340. Moreover, the movable area extraction unit 34 performs the thinning processing of the extracted movable area 340. The thinning processing of the movable area 340 can be performed, for example, by using the well known Hilditch thinning method. Specifically, the movable area extraction unit 34 performs the thinning processing of the movable area 340 by eliminating one pixel at a time from the extended obstacle area 320 until the movable area 340 becomes a line. Accordingly, the linear movable area 341 obtained with the thinning processing represents the movable area that is the farthest from an obstacle existing in the periphery.

Figure 6:
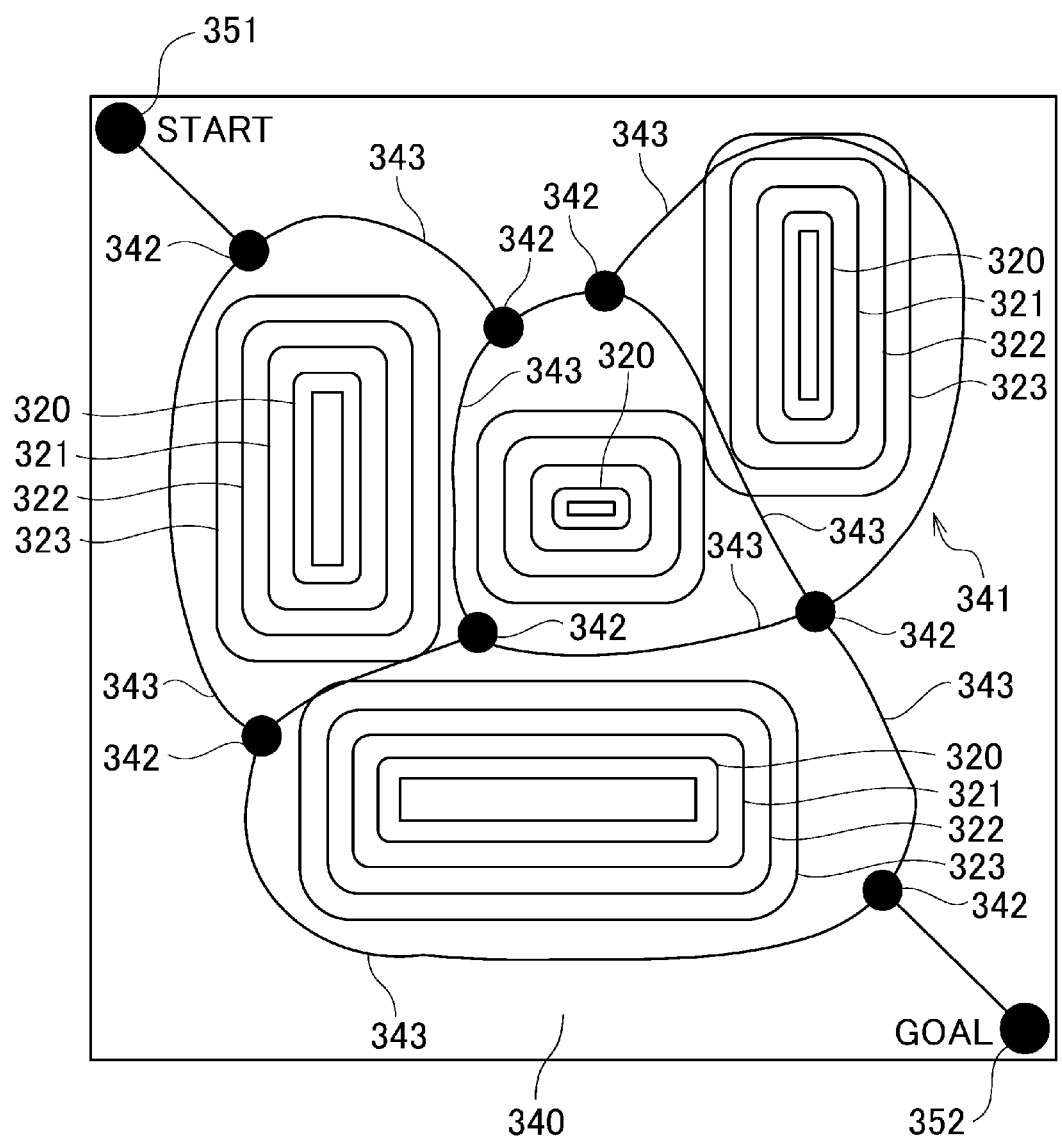
FIG. 6 is a diagram explaining the method of searching for the node.

The route planning unit 35 plans the travel route by searching for the shortest route that connects the starting position and the goal position within the movable area 341 that was extracted and thinned with the movable area extraction unit 34. Moreover, the route planning unit 35 acquires the clearance of the route at the pass-through point (hereinafter also referred to as the "sub goal") from the extended areas 321 to 323 on the integrated map to which the sub goal on the planned travel route belongs. The route planning unit 35 foremost executes the node search of the thinned movable area 341. Specifically, all nodes 342 are searched and represented as a node map as shown in FIG. 6. Note that, here, the branching point (or integration point) of the thinned movable area 341 is referred to as a node 342, and the thinned movable area 341 connecting the node 342 and the node 342 is referred to as a link 343.

Figure 7:
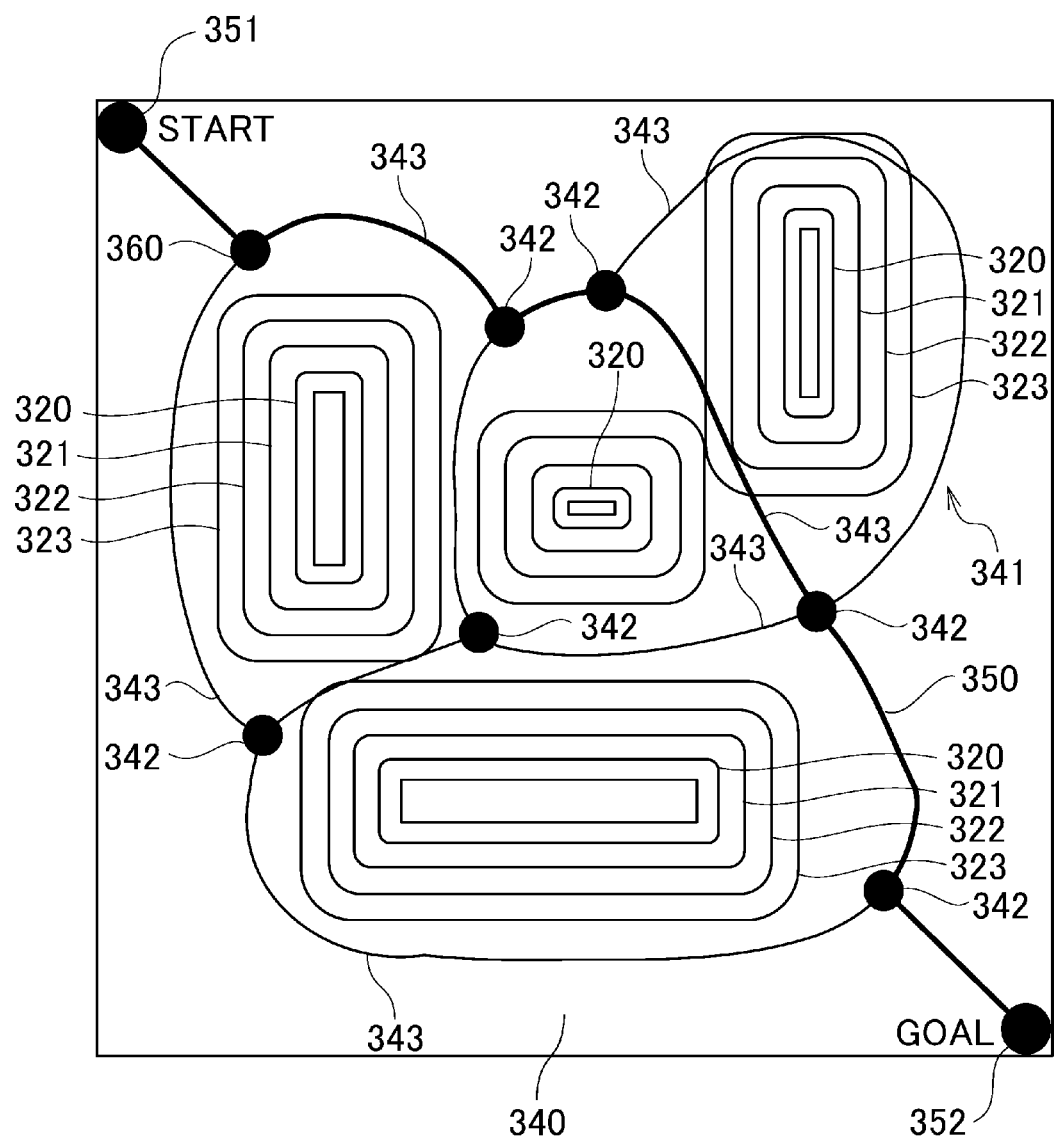
FIG. 7 is a diagram explaining the method of searching for the shortest route.
Figure 8:
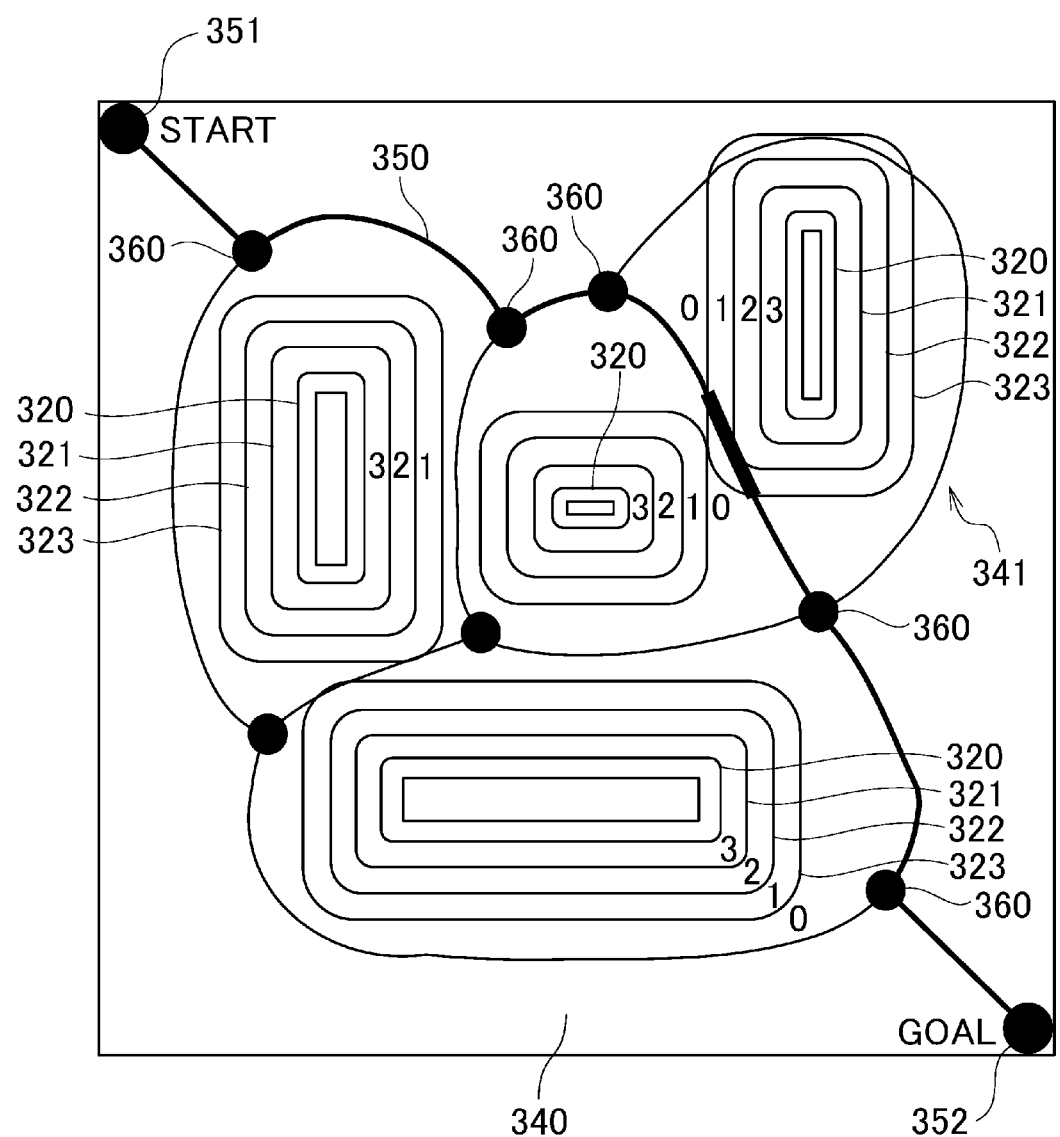
FIG. 8 is a diagram explaining the method of acquiring the route clearance.

Next, the route planning unit 35 performs the shortest route search using a search algorithm such as the well known A* algorithm (A star algorithm) or the like and decides the travel route. Specifically, the route planning unit 35 decides the travel route 350 by using, as shown in FIG. 7, the A* algorithm with the starting position 351 and the goal position 352 as the base points, and computing through which node 342 and which link 343 on the integrated map need to be traveled in order to achieve the minimum cost (shortest route). Subsequently, the route planning unit 35 acquires, as shown in FIG. 8, the route clearance information for each sub goal 360 depending on the extended area 321 to 323 to which the sub goal 360 on the decided travel route 350 belongs (or the extended area 321 to 323 to which the sub goal 350 does not belong). Here, the foregoing integrated value (for example, "1" "2" "3") of the respective extended areas on the integrated map can be used as the route clearance information. The route planning unit 35 associates and adds the acquired route clearance information of the respective sub goals 360 with and to the route information represented as a sub goal point sequence (coordinate sequence) for each sub goal 360. Route information added with route clearance information is thereby acquired. Note that, when the autonomous mobile device 1 travels along the travel route 350, the travel of the autonomous mobile device 1 is controlled by the coordinates of the sub goal as the subsequent target pass-through position relative to the self location and the route clearance information at such sub goal being read.

Figure 2:
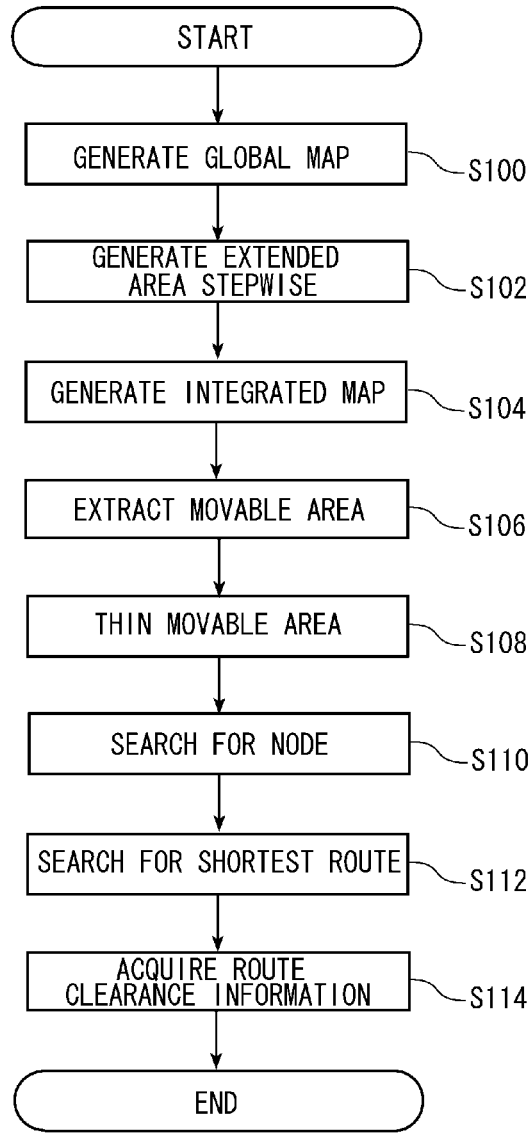
FIG. 2 is a flowchart showing the processing routine of the route planning processing performed by the route planning device according to the first preferred embodiment of the present invention.

The operation of the route planning device 5 and the route planning method are now explained with reference to FIG. 2 to FIG. 8. FIG. 2 is a flowchart showing the processing routine of the route planning processing performed by the route planning device 5. The route planning processing shown in FIG. 2 is performed with the route planning device 5 (electronic controller 30), and is executed, for example, based on the user's command operations before performing the autonomous travel.

Foremost, at step S100, a global map is generated based on the distance information, angle information and the like relative to the peripheral object which were read from the laser range finder 20. Note that the method of generating a global map is as described above, and the detailed explanation thereof is omitted. Next, at step S102, the extended obstacle area 320 is foremost generated by its outline being extended in an amount corresponding to the radius r of the autonomous mobile device 1 for each obstacle area 300 contained in the global map. At step S102, the extended obstacle area 320 is additionally extended, in three stages, in each predetermined range of extension (radius r of the autonomous mobile device 1 in this preferred embodiment), and three extended areas; specifically, the first extended area 321, the second extended area 322, and the third extended area 323 are generated (refer to FIGS. 3 and 4).

At subsequent step S104, an integrated map is generated as a result of the extended obstacle area 320, the first extended area 321, the second extended area 322, and the third extended area 323 generated at step S102 being superposed and integrated (refer to FIG. 4). Subsequently, at step S106, the area excluding the extended obstacle area 320 is extracted from the integrated map generated at step S104 as the movable area 340 where the autonomous mobile device 1 can travel without coming in contact with an obstacle (refer to FIG. 5). Next, at step S108, the thinning processing of the extracted movable area 340 is performed. Note that the thinning processing of the movable area 340 is as described above, and the detailed explanation thereof is omitted.

At subsequent step S110, the node search of the thinned movable area 341 is executed (refer to FIG. 6). Subsequently, at step S112, for example, the A* algorithm is used with the starting position and the goal position as the base points, and through which node 342 and which link 343 on the integrated map need to be traveled in order to achieve the minimum cost (shortest route) is computed, and decided as the route 350 (refer to FIG. 7).

At subsequent step S114, the route clearance information is acquired for each sub goal 360 depending on the extended area 321 to 323 to which the sub goal 360 on the decided route 350 belongs (or the extended area 321 to 323 to which the sub goal 350 does not belong) (refer to FIG. 8). Route information added with route clearance information is acquired as a result of associating and adding the acquired route clearance information of the respective sub goals 360 with and to the route information represented as a sub goal point sequence (coordinate sequence) for each sub goal 360. The electronic controller 30 controls the advancing speed of the autonomous mobile device 1 so that, for example, when the autonomous mobile device 1 travels along the travel route 350 that was acquired as described above, the speed upon passing through the route of weight "1" (interval shown with an extra-thick line in FIG. 8) is reduced in comparison to the speed upon passing through the route of weight "0". Note that, in the foregoing example, although the travel route 350 does not pass through the area of weight "2", if the travel route 350 passes through the area of weight "2", the advancing speed can be reduced in comparison to the area of weight "1".

Moreover, upon passing through the area of weight "3", the autonomous mobile device 1 can be controlled to derail from the travel route 350.

According to this preferred embodiment, the extended obstacle area 320 and the three extended areas 321 to 323 generated as a result of the outline of the obstacle area 300 being extended stepwise are superposed and integrated, and the integrated map is thereby generated. Accordingly, the boundary of the respective extended areas 321 to 323 on the integrated map is disposed according to the distance from the extended obstacle area 320 (that is, from the obstacle). Thus, upon planning the travel route 350, it is possible to comprehend the route clearance of the sub goal 360 from the integrated value of the extended areas 321 to 323 to which the sub goal 360 on the travel route 350 belongs. Accordingly, it is possible to comprehend, in advance (at the route planning stage), the route clearance of the sub goal 360 on the planned travel route 350. Moreover, according to this preferred embodiment, since it is possible to comprehend the route clearance from the integrated value of the extended areas 321 to 323 to which the sub goal 360 belongs, the route clearance of the sub goal 360 can be recognized with lesser amount of operation.

According to this preferred embodiment, since the outline of the obstacle area 300 is foremost extended in an amount corresponding to the radius r of the autonomous mobile device 1, the size of the autonomous mobile device 1 relative to the outline of the extended obstacle area 300 (extended obstacle area 320) can be viewed as a point upon extracting the movable area 340. Moreover, since the outline of the extended obstacle area 320 is further extended in a predetermined range of extension (radius r of the autonomous mobile device 1 in this preferred embodiment), the route clearance of the pass-through point on the travel route can be comprehended, with the foregoing range of extension as a unit, as a multiple of the range of extension. Note that, in this preferred embodiment, since the range of extension has been unified to the same value by using the radius r of the autonomous mobile device 1 as the predetermined range of extension, the operation load of the electronic controller 30 can be reduced.

Since the autonomous mobile device 1 according to this preferred embodiment includes the route planning device 5, the route clearance of each sub goal 360 can be comprehended in advance. Accordingly, for example, an appropriate travel speed according to the route clearance of each sub goal 360 can be set in advance for each sub goal 360.

A preferred embodiment of the present invention was explained above, but the present invention is not limited to the foregoing preferred embodiment, and can be modified variously. For example, in the foregoing preferred embodiment, although the radius r of the autonomous mobile device 1 was preferably used as the range of extension upon extending the extended obstacle area 320, the range of extension is not limited to the radius r of the autonomous mobile device 1, and may be arbitrarily set. Moreover, in the foregoing preferred embodiment, although the extended obstacle area 320 was preferably extended in three stages, it may also be extended in two stages or four stages or more. In addition, the value (weight) that is given to the grids configuring the respective extended areas 321 to 323 upon integrating the respective extended areas 321 to 323 is not limited to "1", and an arbitrary value may be set.

In the foregoing preferred embodiment, although the A* algorithm was preferably used for the shortest route search, another algorithm, for example, the Dijkstra method, the best-first search or the like may also be used.

In the foregoing preferred embodiment, although the SLAM technology was preferably used upon generating a global map, the global map may also be generated using a method other than SLAM. Moreover, the global map may also be generated from an architectural drawing, or a global map generated with another device may be transferred to the autonomous mobile device 1. Moreover, although the laser range finder 20 was preferably used for measuring the distance to the obstacle upon generating a global map, the configuration may use, in substitute for or in addition to the laser range finder, for example, a stereo camera, an ultrasonic sensor and the like.

In the foregoing preferred embodiment, although an omni wheel 13 capable of moving in all directions was preferably used as the wheel, the configuration may also use a standard wheel (steering wheel and drive wheel).

Second Preferred Embodiment

Figure 9:
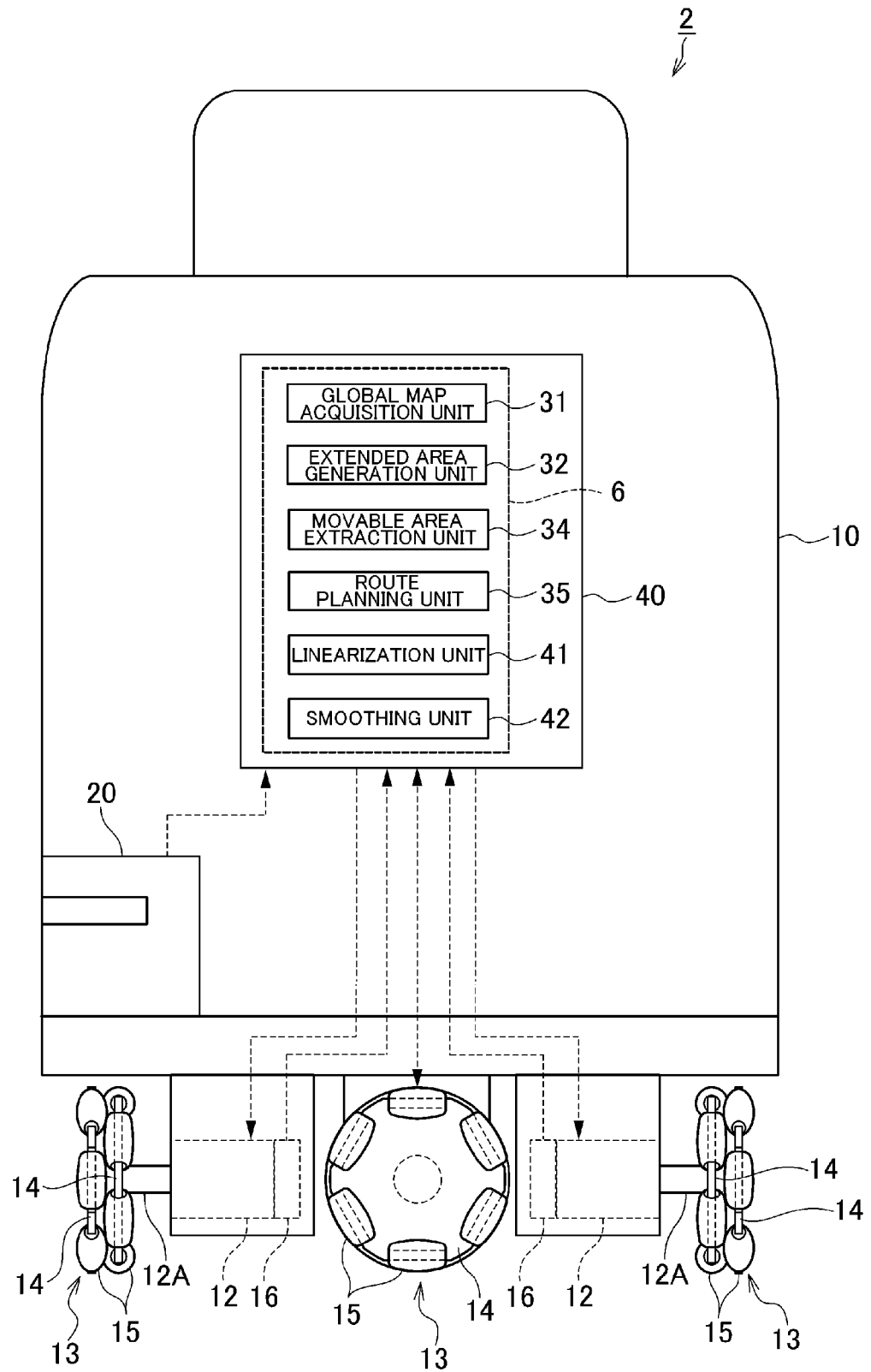
FIG. 9 is a block diagram showing the configuration of the autonomous mobile device mounted with the route planning device according to a second preferred embodiment of the present invention.

The configuration of a route planning device 6 and an autonomous mobile device 2 mounted with the foregoing route planning device 6 according to the second preferred embodiment is now explained with reference to FIG. 9. FIG. 9 is a block diagram showing the configuration of the autonomous mobile device 2 mounted with the route planning device 6.

The autonomous mobile device 2 preferably performs the functions of generating an ambient environmental map (map showing an area containing obstacles and an area that does not contain obstacles; hereinafter referred to as the "global map"), planning a travel route which connects the starting point (start point) and the destination (goal point) on the global map given by the user, and autonomously traveling from the start point to the goal point along the planned route. Thus, the autonomous mobile device 2 preferably includes a main body 10 provided with an electric motor 12 at the lower portion thereof and an omni wheel 13 that is driven with the electric motor 12, and a laser range finder 20 to measure the distance to the obstacles existing in the periphery. Moreover, the autonomous mobile device 2 preferably includes an electronic controller 40 which includes a route planning device 6 to plan the travel route, and which controls the electric motor 12 so that the autonomous mobile device 2 travels along the planned route. Each of the constituent elements is described in detail below.

The main body 10 is a metal frame formed, for example, in an approximate cylindrical bottomed shape, and the main body is mounted with the laser range finder 20, the electronic controller 40 including the route planning device 6, and so on. Note that the shape of the main body 10 is not limited to an approximate cylindrical bottomed shape. At the lower portion of the main body 10, four electric motors 12 are provided and arranged to define a cross shape. An omni wheel 13 is mounted to a drive shaft 12A of each of the four electric motors 12. Specifically, the four omni wheels 13 are mounted by being spaced at 90° intervals along the circumferential direction in a concyclic manner.

The omni wheel 13 is a wheel including two wheels 14 that rotate around the drive shaft 12A of the electric motor 12, and six free rollers 15 provided rotatably around a shaft that is orthogonal to the drive shaft 12A of the electric motor 12 at the outer circumference of the respective wheels 14, and is able to move omnidirectionally. Note that the two wheels 14 are mounted by shifting the phase by 30°. Based on this configuration, when the electric motor 12 is driven and the wheel 14 is rotated, the six free rollers 15 rotate integrally with the wheels 14. Meanwhile, as a result of the grounded free rollers 15 rotating, the omni wheel 13 can also move in a direction that is parallel with the rotating shaft of that wheel 14. Thus, by independently controlling the four electric motors 12 and independently adjusting the rotating direction and rotating speed of the respective four omni wheels 13, the autonomous mobile device 2 can be moved in an arbitrary direction (omnidirectionally).

The drive shaft 12A of each of the four electric motors 12 is mounted with an encoder 16 to detect the angle of rotation of the drive shaft 12A. Each encoder 16 is connected to the electronic controller 40, and outputs the detected angle of rotation of the respective electric motors 12 to the electronic controller 40. The electronic controller 40 computes the travel distance of the autonomous mobile device 2 from the angle of rotation of the respective electric motors 12 that was input.

The laser range finder 20 is mounted on the front portion of the autonomous mobile device 2 so as to face the front (forward) direction of the autonomous mobile device 2. The laser range finder 20 scans the circumference of the autonomous mobile device 2 in a fan-like manner in the horizontal direction with a central angle of 240° by emitting a laser and reflecting the emitted laser with a rotating mirror. Subsequently, the laser range finder 20 detects the laser that was returned by reflecting off an object such as a wall or an obstacle, and detects the angle formed with and the distance to the object by measuring the detection angle of the laser (reflected wave) and the time (propagation time) from the emission of the laser to the return thereof upon being reflected off an object. Note that the laser range finder 20 is connected to the electronic controller 40, and outputs, to the electronic controller 40, the detected distance information and angle information relative to the peripheral object.

The electronic controller 40 governs the overall control of the autonomous mobile device 2. The electronic controller 40 preferably includes a microprocessor that performs operations, a ROM that stores programs and the like for causing the microprocessor to execute the respective processes, a RAM that temporarily stores various types of data such as operation results and the like, and a backup RAM that retains stored contents. Moreover, the electronic controller 40 preferably includes an interface circuit arranged to electrically connect the laser range finder 20 and the microprocessor, a driver circuit arranged to drive the electric motor 12, and so on.

The electronic controller 40 includes the route planning device 6 which plans the travel route, and plans the travel route as well as controls the electric motor 12 so that the autonomous mobile device 2 travels along the planned route. The route planning device 6 includes a global map acquisition unit 31, an extended area generation unit 32, a movable area extraction unit 34, a route planning unit 35, a linearization unit 41, and a smoothing unit 42 to generate the travel route and performing linearization and smoothing to the generated travel route. Note that each of the foregoing components is preferably configured by combining the foregoing hardware and software.

The global map acquisition unit 31 preferably uses, for example, SLAM technology or the like to generate a global map showing an area containing obstacle (obstacle area) and an area that does not contain obstacles. Here, a global map is a map that is configured from a plane in which a horizontal plane is divided into blocks of a predetermined size (for example, 1 cm×1 cm), and a grid containing an obstacle is given, for example, a value that is greater than "0" and a grid that does not contain an obstacle is given a value that is less than "0".

When generating a global map using the SLAM technology, foremost, the global map acquisition unit 31 generates a local map based on the distance information and angle information relative to the peripheral object that are read from the laser range finder 20, and additionally computes the travel distance of the autonomous mobile device 2 based on the angle of rotation of the respective electric motors 12 read from the encoder 16. Next, the global map acquisition unit 31 stochastically estimates the self location using the Bayesian filtering (Bayes' theorem) from the generated local map and the travel distance of the autonomous mobile device 2. Subsequently, the global map acquisition unit 31 projects the local map on the global map by performing coordinate transformation to the local map in which the laser range finder serves as the original point, with the self location being adjusted from the coordinate system in which the laser range finder 20 serves as the original point to the coordinate system of the global map. The global map acquisition unit 31 repeatedly executes this processing while traveling, and generates a global map of the entire ambient environment by sequentially appending (adding) the local map to the global map.

Figure 10:
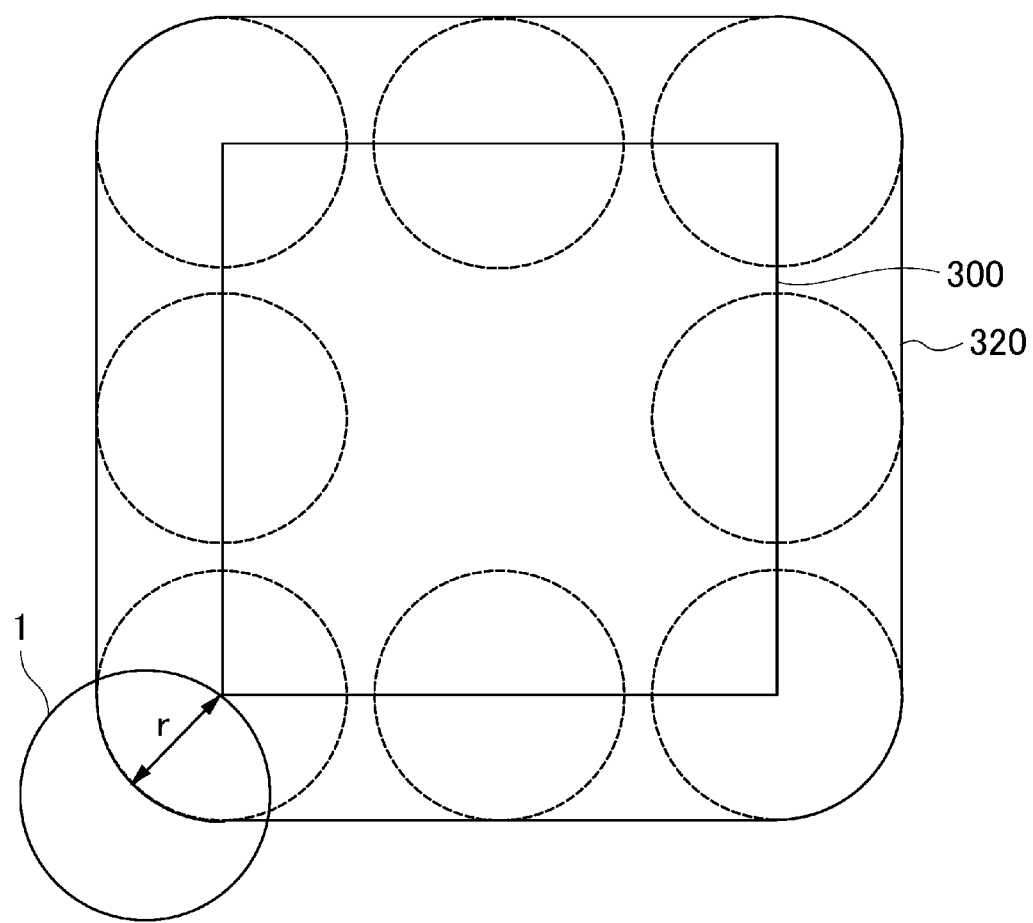
FIG. 10 is a diagram explaining the method of extending the obstacle area (Minkowski sum operation).

The extended area generation unit 32 extends an outline of the obstacle area contained in the global map generated with the global map acquisition unit 31 in an amount corresponding to a radius of the autonomous mobile device 2 to generate the extended area. For the generation of an extended area, for example, the well known Minkowski sum can be used. Specifically, as shown in FIG. 10, the obstacle area that is extended (hereinafter also referred to as the "extended obstacle area") 320 is generated by extending the outline (boundary) of the obstacle area 300 in an amount corresponding to the radius r of the autonomous mobile device 2. Based on this processing, the size of the autonomous mobile device 2 can be deemed a point relative to the extended obstacle area 320.

Figure 11:
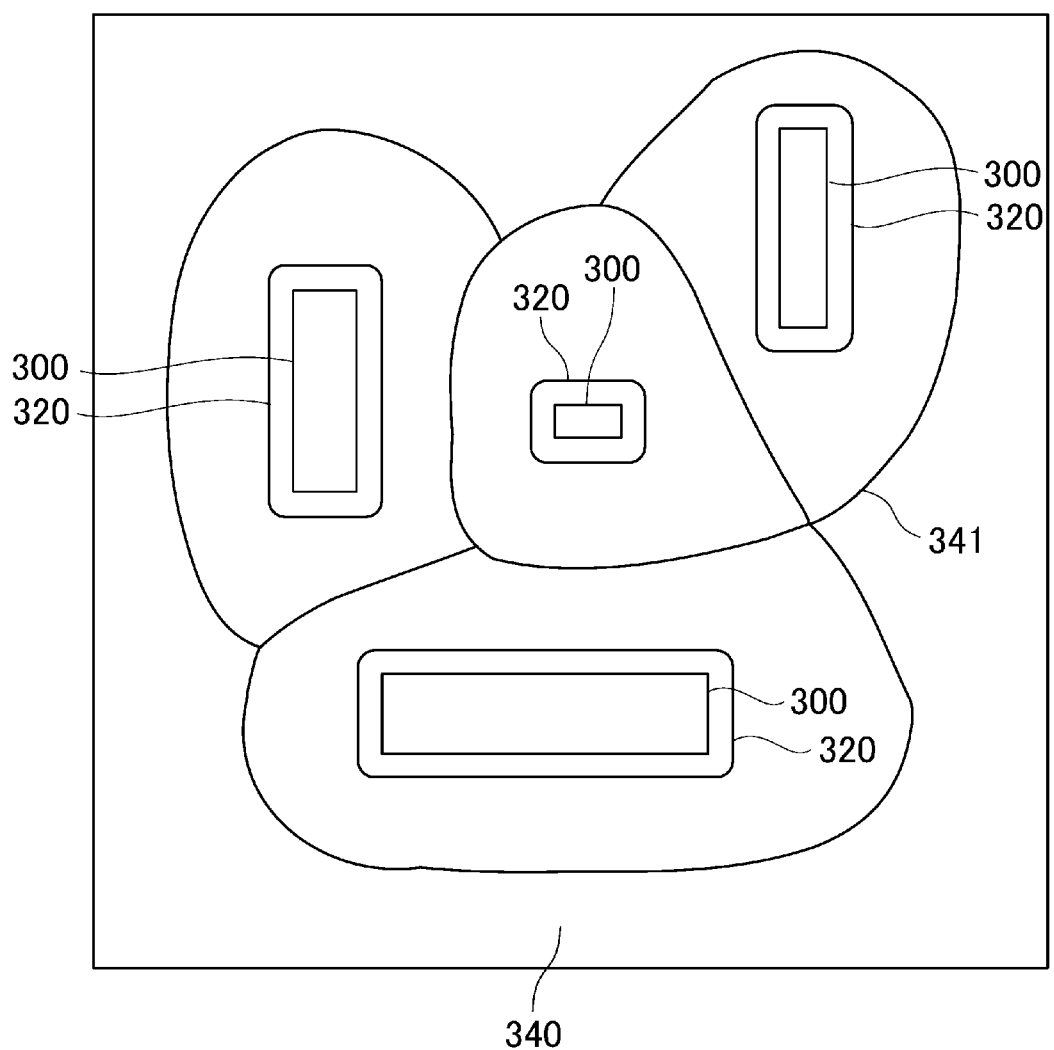
FIG. 11 is a diagram explaining the method of extracting and method of thinning the movable area.

The movable area extraction unit 34 extracts, from the global map with an extended obstacle area, an area (movable area) where the autonomous mobile device 2 can travel without coming in contact with an obstacle. As shown in FIG. 11, in this preferred embodiment, an area excluding the extended obstacle area 320 on the global map is extracted as the movable area 340. Moreover, the movable area extraction unit 34 performs the thinning processing of the extracted movable area 340. The thinning processing of the movable area 340 can be performed, for example, by using the well known Hilditch thinning method. Specifically, the movable area extraction unit 34 performs the thinning processing of the movable area 340 by eliminating one pixel at a time from the extended obstacle area 320 until the movable area 340 becomes a line. Accordingly, the linear movable area 341 obtained with the thinning processing represents the movable area that is the farthest from an obstacle existing in the periphery.

Figure 12:
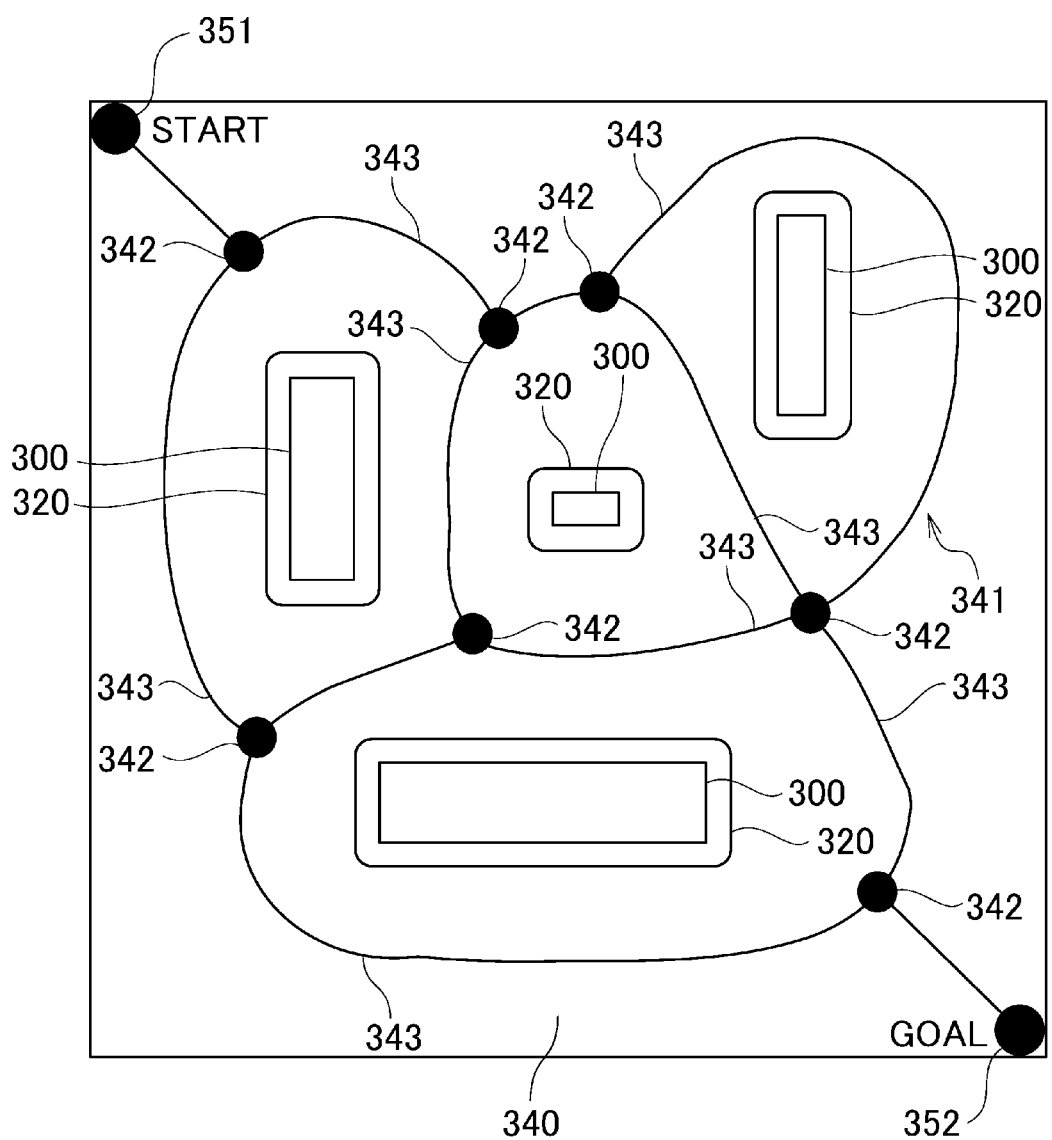
FIG. 12 is a diagram explaining the method of searching for the node.

The route planning unit 35 plans the travel route by searching for the shortest route that connects the start point and the goal point within the movable area 341 that was extracted and thinned with the movable area extraction unit 34. More specifically, the route planning unit 35 foremost executes the node search of the thinned movable area 341. Specifically, all nodes are searched and represented as a node map as shown in FIG. 12. Note that, here, the branching point (or integration point) of the thinned movable area 341 is referred to as a node 342, and the thinned movable area 341 connecting the node 342 and the node 342 is referred to as a link 343.

Figure 13:
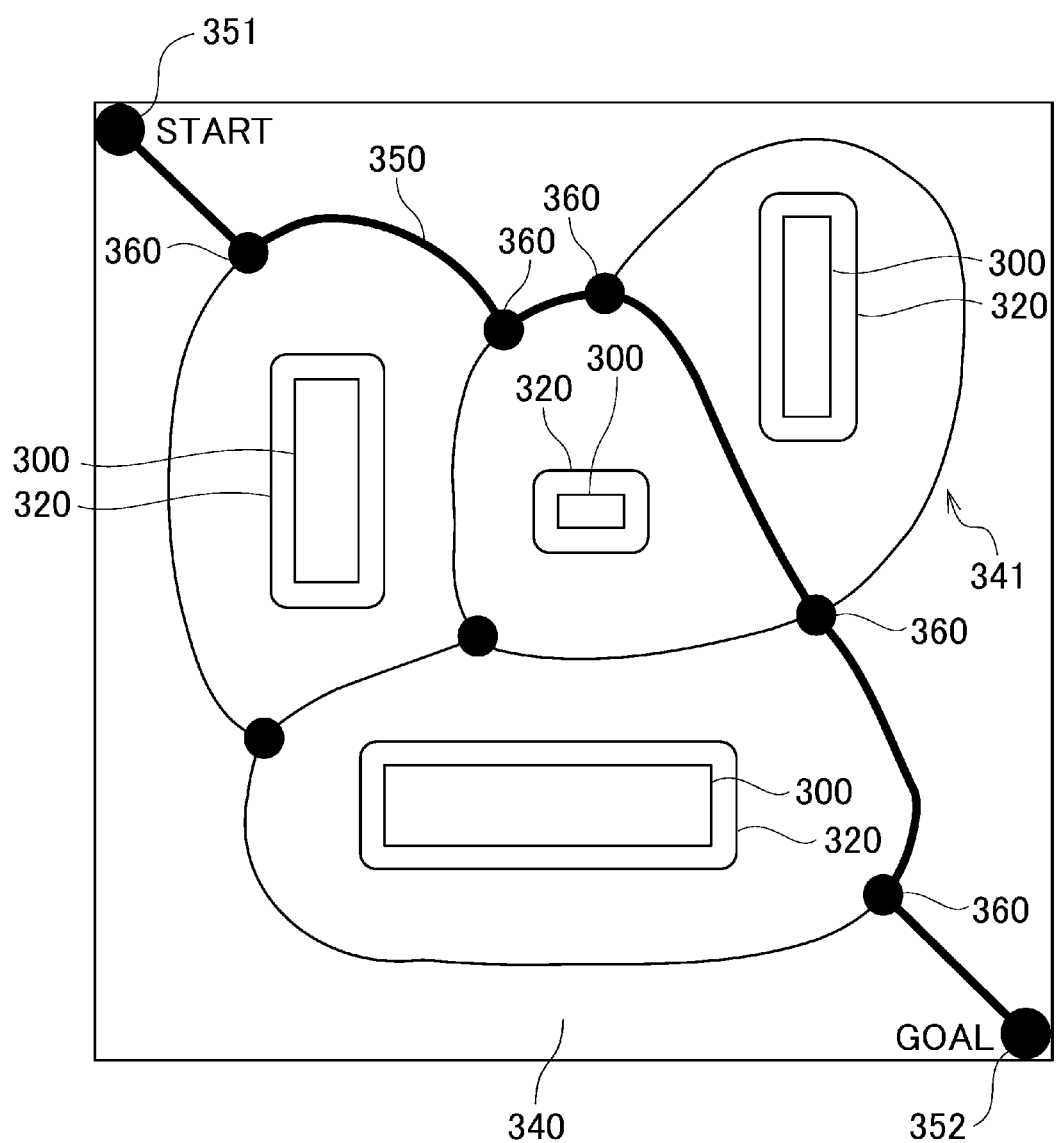
FIG. 13 is a diagram explaining the method of searching for the shortest route.

Next, the route planning unit 35 performs the shortest route search using a search algorithm such as the well known A* algorithm (A star algorithm) or the like and decides the travel route, and the target pass-through point (hereinafter also referred to as the "sub goal") on the travel route. Specifically, the route planning unit 35 decides the travel route 350 by using, as shown in FIG. 13, the A* algorithm with the start point 351 and the goal point 352 as the base points, and computing through which node 342 and which link 343 on the global map need to be traveled in order to achieve the minimum cost (shortest route), and additionally decides the sub goal 360 on the travel route 350. The route planning unit 35 acquires the route information which represents the decided travel route 350 as a sub goal point sequence (coordinate sequence).

The linearization unit 41 performs linearization processing to the travel route 350 planned with the route planning unit 35 without interfering with the extended obstacle area 320. More specifically, the linearization unit 41 extracts two points (hereinafter also referred to as the "sub goal candidates") on the travel route 350 and connects the two points with a straight line, and, if the connected straight line does not interfere with the extended obstacle area 320, re-sets the straight line as the travel route connecting the foregoing two points. Note that, in the foregoing case, the sub goal 360 sandwiched between the foregoing two points is deleted.

Figure 14:
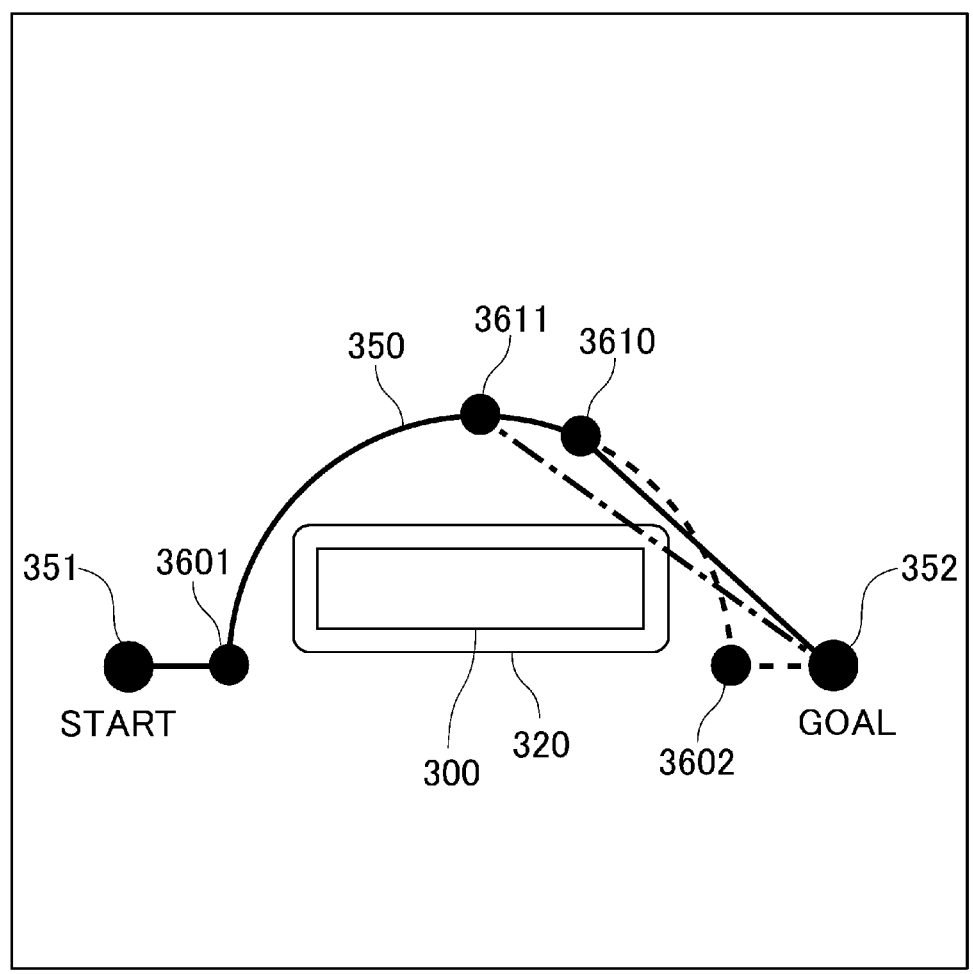
FIG. 14 is a diagram explaining the method of linearizing the travel route.

Here, the method of linearizing the travel route 350 is now explained in further detail with reference to FIG. 14. Note that the explanation is provided on the assumption that the travel route 350 (start 351, first sub goal 3601, second sub goal 3602, goal 352) shown in FIG. 14 was acquired. Foremost, if the goal 352 and the sub goal candidate 3610 are extracted, since the straight line connecting these two points does not interfere with the extended obstacle area 320, this straight line is re-set as the travel route. Moreover, in the foregoing case, the sub goal candidate 3610 is set as the official sub goal, and the second sub goal 3602 sandwiched between the foregoing two points is deleted. Meanwhile, if the goal 352 and the sub goal candidate 3611 are extracted, the straight line connecting these two points will interfere with the extended obstacle area 320. Thus, this straight line is not re-set as the travel route.

Figure 15:
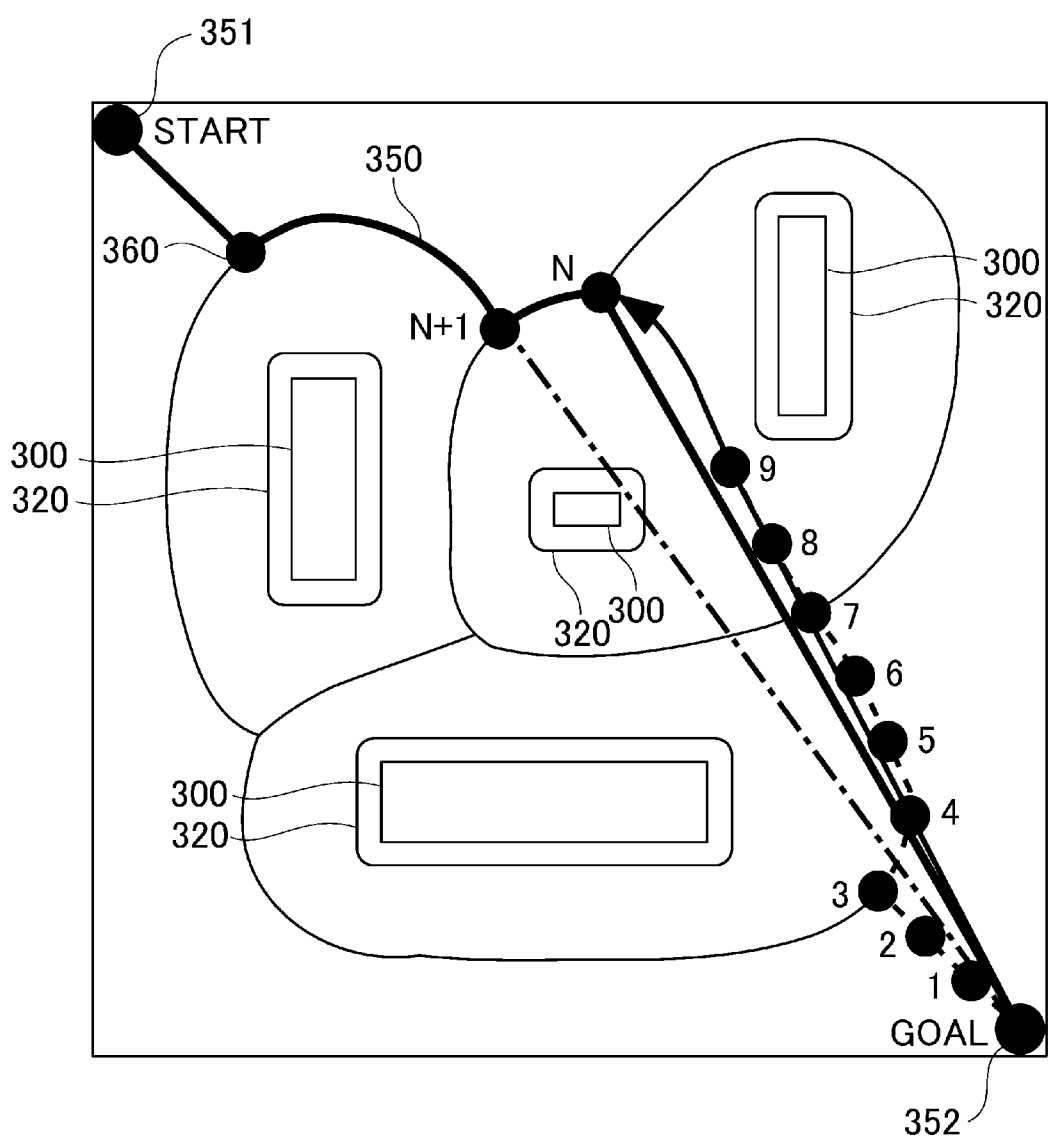
FIG. 15 is a diagram explaining the method of linearizing the entire travel route.

Moreover, as shown in FIG. 15, the linearization unit repeatedly executes the foregoing linearization processing from the goal 352 to the start 351, and re-sets the travel route 350 and the sub goal 360. Here, the linearization unit 41 performs the linearization processing to the travel route 350 from the goal 352 to the start 351 according to the following routine.

1. The sub goal candidates (locations 1, 2, 3, ... n, ... N, N+1, ... ) are set by tracing one predetermined grid (for example, one grid) at a time from the goal 352 in the direction of the start 351 on the travel route 350.
2. A straight line is drawn between the goal 352 and a sub goal candidate (location n).
3. Whether the newly drawn straight line interferes with the extended obstacle area 320 is checked.
4. When n=N+1, if the newly drawn straight line interferes with the extended obstacle area 320, the sub goal candidate of the location N is re-set as the new sub goal 360.
5. The routine of foregoing processes 1 to 4 is repeatedly executed while tracing from the new sub goal 360 in the direction of the start 351 on the travel route 350 to sequentially re-set the sub goal 360, and this routine is ended upon reaching the start 351.

Figure 16:
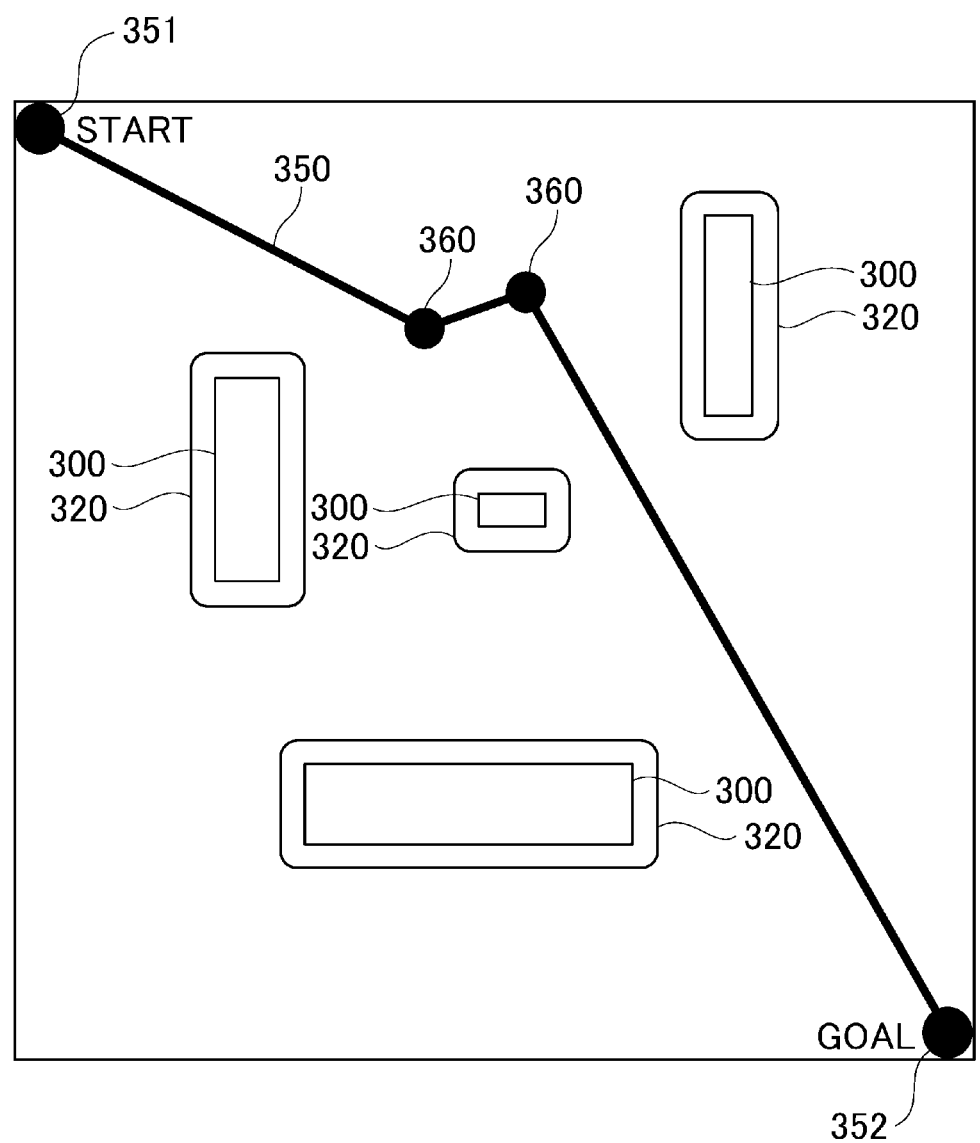
FIG. 16 is a diagram showing an example of the linearized travel route.

Here, FIG. 16 shows the results upon performing the linearization processing from the goal 352 to the start 351 to the travel route 350 shown in FIG. 13.

The smoothing unit 42 performs the smoothing processing to the travel route 350 linearized with the linearization unit 41 without interfering with the extended obstacle area 320. More specifically, the smoothing unit 42 extracts the sub goal 360 on the travel route 350 and two points (sub goal candidates) on the travel route 350 sandwiching the sub goal 360, connects the two points with a straight line, and, if the connected straight line does not interfere with the extended obstacle area 320, re-sets the straight line as the travel route connecting the two points. Note that, in the foregoing case, the sub goal 360 sandwiched between the foregoing two points is deleted.

Figure 17:
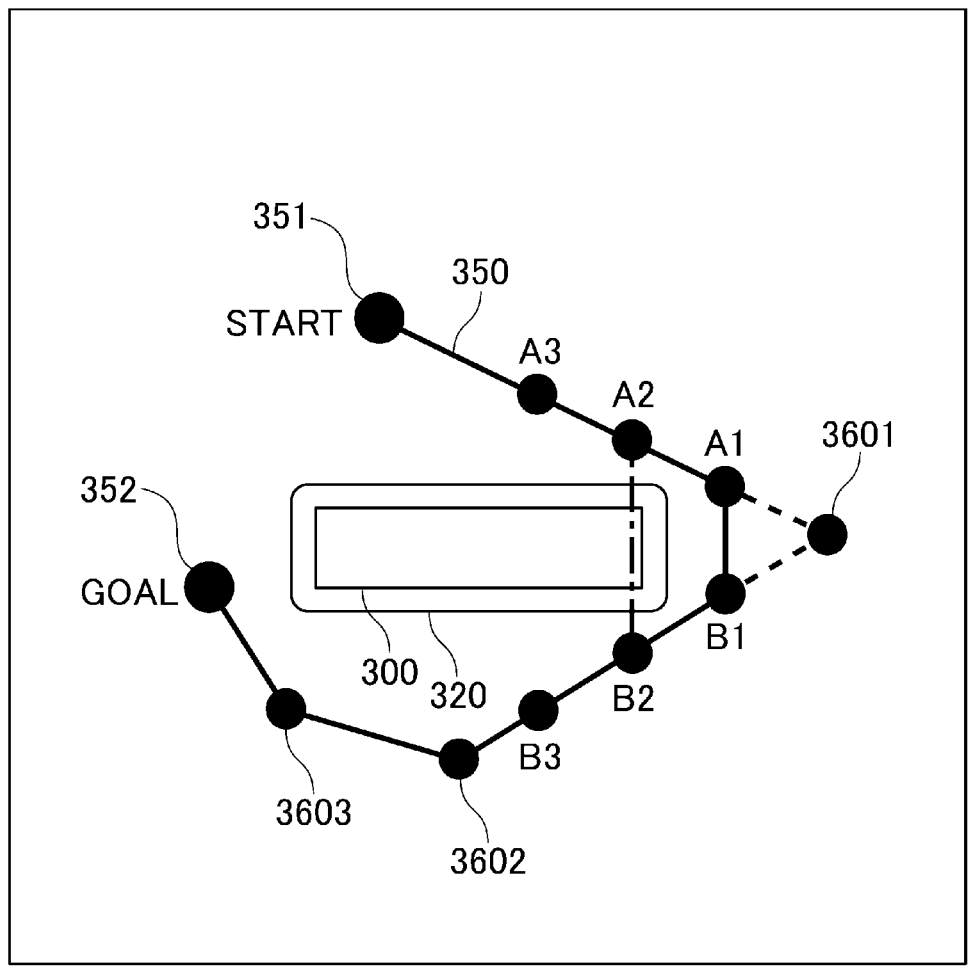
FIG. 17 is a diagram explaining the method of smoothing the travel route.

Here, the method of smoothing the travel route 350 is explained in further detail with reference to FIG. 17. Note that the explanation is provided on the assumption that the travel route 350 (start 351, first sub goal 3601, second sub goal 3602, third sub goal 3603, goal 352) shown in FIG. 17 was acquired. The smoothing unit 42 performs the smoothing of the travel route 350 according to the following routine.

1. The three points of the start 351, the first sub goal 3601, and the second sub goal 3602 are extracted.
2. If the angle formed by the three points is not greater than a certain value (this value is decided according to the mobility of the autonomous mobile device 2), the routine proceeds to the following process 3. Meanwhile, if the angle formed by the three points is greater than the foregoing certain value, the routine returns to process 1, the following three points; that is, the three points of the first sub goal 3601, the second sub goal 3602, and the third sub goal 3603 are extracted, and this process is performed once again.
3. The sub goal candidates (locations A1, A2, A3, ... , An, ... , AN, AN+1, ... ) are set by tracing one predetermined grid (for example, one grid) at a time from the first sub goal 3601 in the direction of the start 351 on the travel route 350.
4. Similarly, the sub goal candidates (locations B1, B2, B3, ... , Bn, ... , BN, BN+1, ... ) are set by tracing, for example, one grid at a time from the first sub goal 3601 in the direction of the second sub goal 3602 on the travel route 350.
5. A straight line is drawn between the pair of sub goal candidates (locations An, Bn).
6. Whether the newly drawn straight line interferes with the extended obstacle area 320 is checked.
7. When n=N+1, if the newly drawn straight line interferes with the extended obstacle area 320, the pair of the sub goal candidate of the locations AN and BN (A1 and B1 in FIG. 17) is re-set as the new sub goal 360.
8. Next, the sub goal 360 of the location BN (B1 in FIG. 17), the second sub goal 3602, and the third sub goal 3603 are extracted, the same routine as above (processes 1 to 7) is performed, and this routine is ended upon reaching the goal 352.

Figure 18:
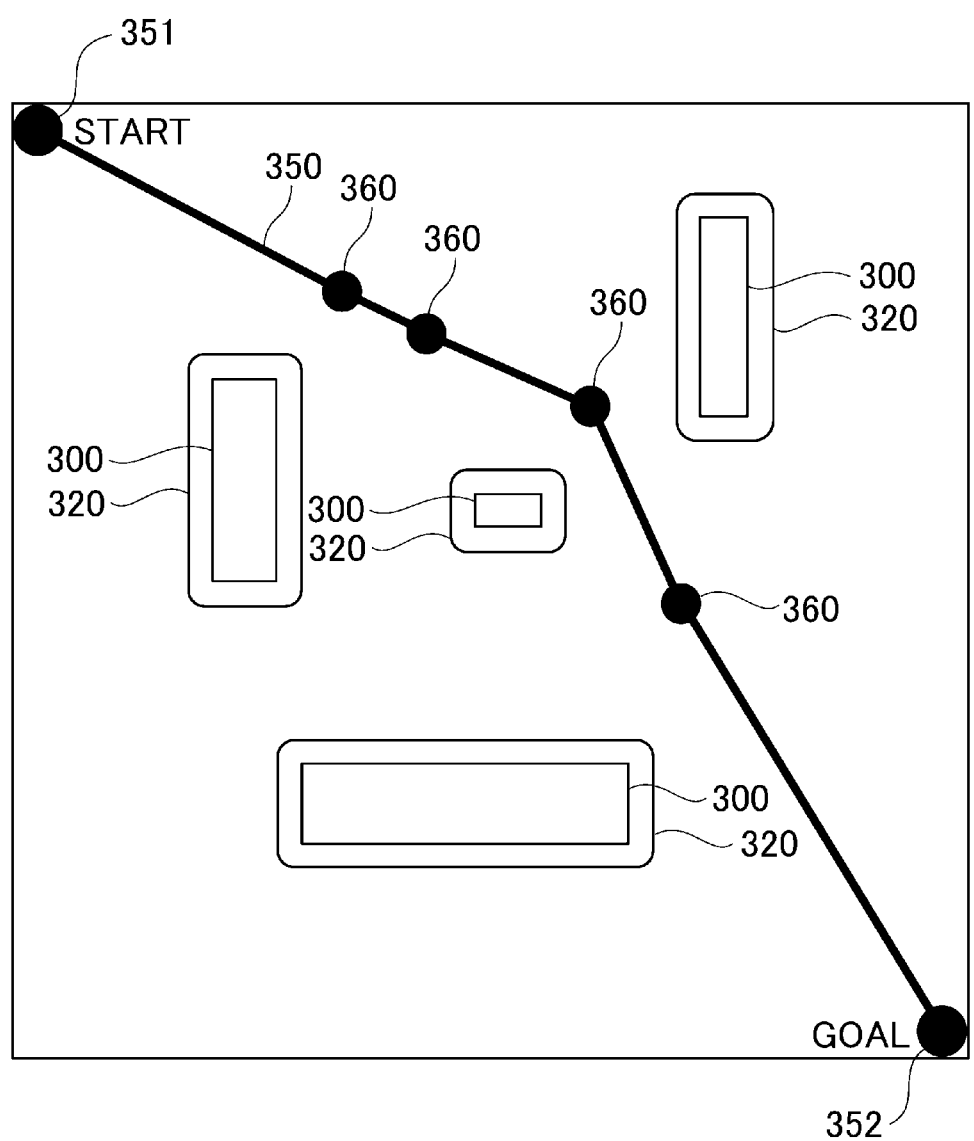
FIG. 18 is a diagram showing an example of the smoothed travel route.

Here, FIG. 18 shows the results upon performing the smoothing processing to the travel route 350 shown in FIG. 16.

Figure 19:
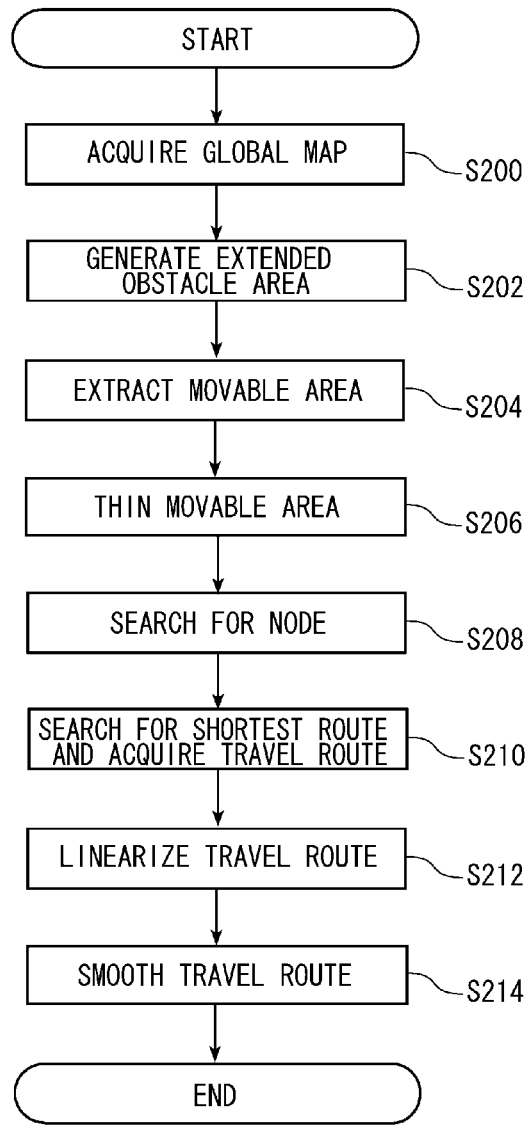
FIG. 19 is a flowchart showing the processing routine of the route planning processing including the linearization processing and smoothing processing performed by the route planning device according to the second preferred embodiment of the present invention.

The operation of the route planning device 6 is now explained with reference to FIG. 19. FIG. 19 is a flowchart showing the processing routine of the route planning processing including the linearization processing and smoothing processing performed by the route planning device 6. The route planning processing shown in FIG. 19 is performed with the route planning device 6 (electronic controller 40), and is executed, for example, based on the user's command operations before performing the autonomous travel.

Foremost, at step S200, a global map is generated based on the distance information, angle information and the like relative to the peripheral object which were read from the laser range finder 20. Note that the method of generating a global map is as described above, and the detailed explanation thereof is omitted. Next, at step S202, the extended obstacle area 320 is generated by its outline being extended in an amount corresponding to the radius r of the autonomous mobile device 2 for each obstacle area 300 contained in the global map (refer to FIG. 10).

At subsequent step S204, the area excluding the extended obstacle area 320 generated from the global map at step S202 is extracted as the movable area 340 where the autonomous mobile device 2 can travel without coming in contact with an obstacle. Subsequently, at step S206, the thinning processing of the extracted movable area 340 is performed (refer to FIG. 11). Note that the thinning processing of the movable area 340 is as described above, and the detailed explanation thereof is omitted.

Next, at step S208, the node search of the thinned movable area 341 is executed (refer to FIG. 12). Subsequently, at step S210, for example, the A* algorithm is used with the starting point 351 and goal point 352 as the base points, and through which node 342 and which link 343 on the integrated map need to be traveled in order to achieve the minimum cost (shortest route) is computed, the travel route 350 and the sub goal 360 are thereby decided, and the route information represented as a sub goal point sequence (coordinate sequence) is acquired (refer to FIG. 13).

Subsequently, at step S212, the linearization processing of the travel route 350 is performed from the goal 352 to the start 351 (refer to FIGS. 14 to 16). Note that the linearization of the travel route 350 is as described above, and the detailed explanation thereof is omitted.

Subsequently, at step S214, the smoothing processing of the travel route 350 that was linearized at step S212 is performed (refer to FIGS. 17 and 18). Note that the smoothing of the travel route 350 is as described above, and the detailed explanation thereof is omitted.

According to this preferred embodiment, the planned travel route 350 is linearized without interfering with the extended obstacle area 320. Thus, for example, even in cases where a zigzag travel route is planned by the route planning unit 35, the travel route can be linearized within a range that it will not come in contact with an obstacle. Consequently, it is possible to plan a travel route on which the autonomous mobile device 2 can travel more smoothly. Note that, according to this preferred embodiment, if the straight line connecting the two points on the extracted travel route 350 does not interfere with the extended obstacle area 320, the straight line connecting the two points is re-set as the travel route 350. Thus, the travel route 350 can be linearized appropriately and reliably without interfering with the extended obstacle area 320.

Moreover, according to this preferred embodiment, the linearization of the travel route 350 is repeatedly performed from the goal 352 to the start 351 on the travel route 350. Thus, linearization can be performed across the entire travel route 350 from the start 351 to the goal 352 of the travel route 350.

According to this preferred embodiment, the travel route 350 is smoothed without interfering with the extended obstacle area 320. Thus, for example, even in cases where a travel route with a sharp angle is planned by the route planning unit 35, the travel route can be smoothed within a range that it will not come in contact with an obstacle. Consequently, it is possible to plan a travel route on which the autonomous mobile device 2 can travel more smoothly. Note that, according to this preferred embodiment, if the straight line connecting the two points sandwiching the sub goal 360 on the extracted travel route 350 does not interfere with the extended obstacle area 320, the straight line connecting the two points is re-set as the travel route 350. Thus, the travel route 350 can be smoothed appropriately and reliably without interfering with the extended obstacle area 320.

Moreover, according to this preferred embodiment, the smoothing of the travel route 350 is repeatedly performed from the start 351 to the goal 352 on the travel route 350. Thus, smoothing can be performed across the entire travel route 350 from the start 351 to the goal 352 of the travel route 350.

According to this preferred embodiment, since the travel route 350 is linearized and additionally smoothed thereafter, the travel route 350 can be simplified even further. Thus, for example, even in cases where the travel route is planned with complicated bends by the route planning unit 35, the travel route can be simplified within a range that it will not come in contact with an obstacle. Consequently, it is possible to plan a travel route on which the autonomous mobile device 2 which travels along a travel route can travel more smoothly.

Since the autonomous mobile device 2 according to this preferred embodiment preferably includes the route planning device 6, it is possible to acquire the travel route 350 that was linearized and smoothed without interfering with the obstacle; specifically, the travel route 350 with a shape of being more appropriate for the travel of the autonomous mobile device 2. Consequently, the autonomous mobile device 2 can travel more smoothly upon traveling along the travel route 350 planned with the autonomous mobile device 2.

A preferred embodiment of the present invention was explained above, but the present invention is not limited to the foregoing preferred embodiment, and can be modified variously. For example, in the foregoing preferred embodiment, although the linearization and smoothing of the travel route 350 were preferably performed, the configuration may be such that only either one of linearization or smoothing is performed. Moreover, in the foregoing preferred embodiment, although the linearization and smoothing between the goal 352 and the start 351 were preferably performed, the configuration may also be such that the linearization and/or smoothing is performed partially.

Moreover, in this preferred embodiment, although the sub goal candidate was set one grid at a time, the width of setting the sub goal candidate is not limited to the foregoing preferred embodiment, and may be set arbitrarily. In addition, the planning method of the original travel route 350 applied to linearization and smoothing is not limited to this preferred embodiment.

In this preferred embodiment, although the A* algorithm was preferably used for the shortest route search, another algorithm, for example, the Dijkstra method, the best-first search or the like may also be used.

In this preferred embodiment, although the SLAM technology was preferably used upon generating a global map, the global map may also be generated using a method other than SLAM. Moreover, a global map generated with another device may be transferred. Moreover, although the laser range finder 20 was preferably used for measuring the distance to the obstacle upon generating a global map, the configuration may use, in substitute for or in addition to the laser range finder, for example, a stereo camera, an ultrasonic sensor and the like.

Third Preferred Embodiment

Figure 20:
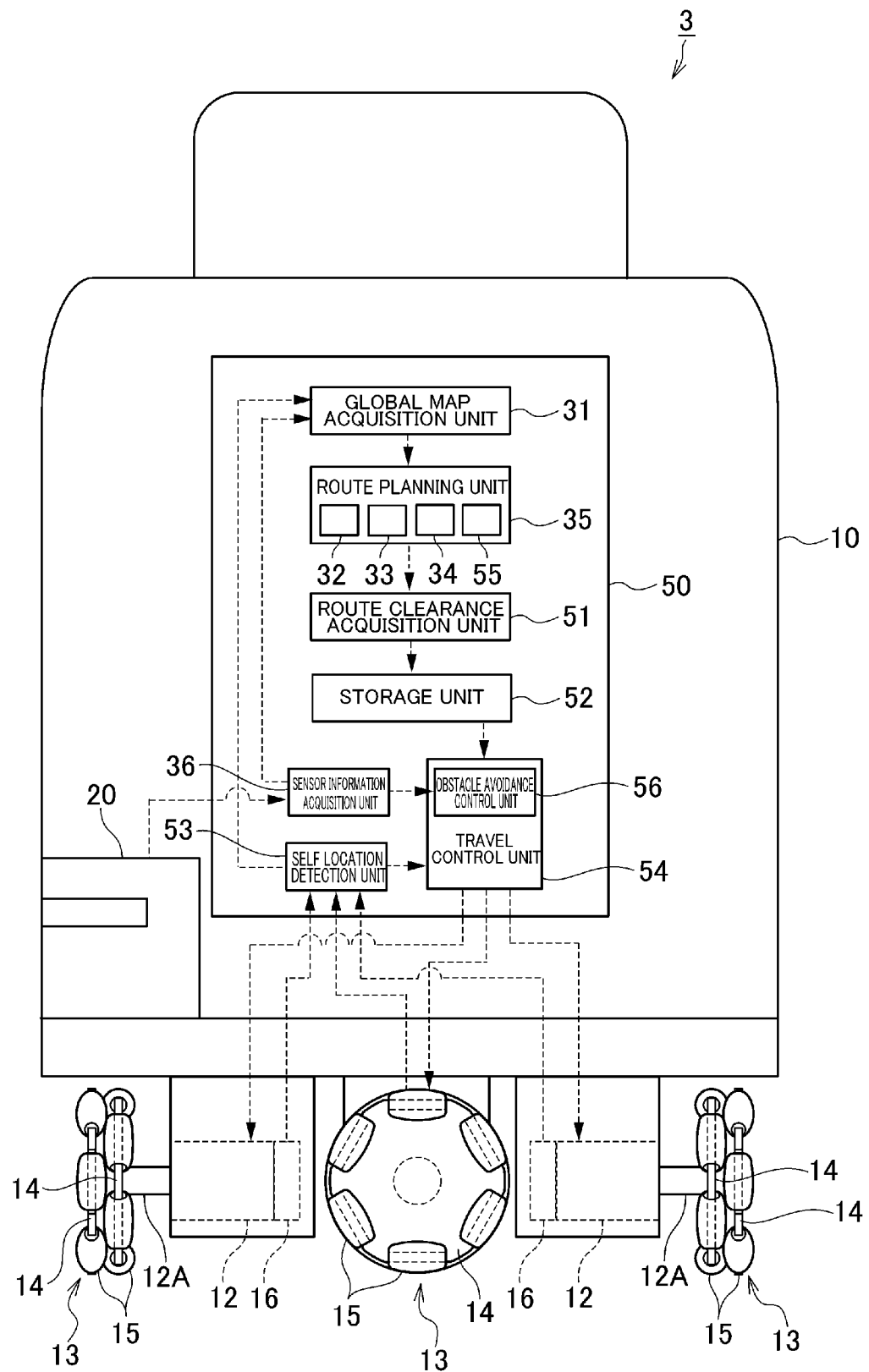
FIG. 20 is a block diagram showing the configuration of the autonomous mobile device according to a third preferred embodiment of the present invention.

The configuration of the autonomous mobile device 3 according to the third preferred embodiment is now explained with reference to FIG. 20. FIG. 20 is a block diagram showing the configuration of the autonomous mobile device 3.

The autonomous mobile device 3 acquires an ambient environmental map (map showing an area containing obstacles and an area that does not contain obstacles; hereinafter referred to as the "global map"), plans a travel route which connects the starting point (starting position) and the destination (goal position) on the global map given by the user, and acquires the route clearance of the travel route.

Moreover, the autonomous mobile device 3 autonomously travels from the starting position to the goal position along the planned travel route, and, upon traveling, performs travel control (for example, adjustment of the travel speed) according to the route clearance of the self location (travel point). Thus, the autonomous mobile device 3 preferably includes a main body 10 provided with an electric motor 12 at the lower part thereof and an omni wheel 13 that is driven with the electric motor 12, a laser range finder 20 to measure the distance to the obstacles existing in the periphery, an electronic controller 50 which plans the travel route and drives the electric motor 12 so that the autonomous mobile device 3 travels along the travel route, acquires the route clearance at the self location (travel point) and controls the electric motor according to the route clearance, and so on. Each of the constituent elements is described in detail below.

The main body 10 is a metal frame formed, for example, in an approximate cylindrical bottomed shape, and the main body is mounted with the foregoing laser range finder 20, the electronic controller 50, and so on. Note that the shape of the main body 10 is not limited to an approximate cylindrical bottomed shape. At the lower portion of the main body 10, four electric motors 12 are provided and arranged to define a cross shape. An omni wheel 13 is mounted to a drive shaft 12A of each of the four electric motors 12. Specifically, the four omni wheels 13 are mounted by being spaced at 90° intervals along the circumferential direction in a concyclic manner.

The omni wheel 13 is a wheel including two wheels 14 that rotate around the drive shaft 12A of the electric motor 12, and six free rollers 15 provided rotatably around a shaft that is orthogonal to the drive shaft 12A of the electric motor 12 at the outer circumference of the respective wheels 14, and is able to move omnidirectionally. Note that the two wheels 14 are mounted by shifting the phase by 30°. Based on this kind of configuration, when the electric motor 12 is driven and the wheel 14 is rotated, the six free rollers 15 rotate integrally with the wheels 14. Meanwhile, as a result of the grounded free rollers 15 rotating, the omni wheel 13 can also move in a direction that is parallel with the rotating shaft of that wheel 14. Thus, by independently controlling the four electric motors 12 and independently adjusting the rotating direction and rotating speed of the respective four omni wheels 13, the autonomous mobile device 3 can be moved in an arbitrary direction (omnidirectionally).

The drive shaft 12A of each of the four electric motors 12 is mounted with an encoder 16 to detect the angle of rotation of the drive shaft 12A. Each encoder 16 is connected to the electronic controller 50, and outputs the detected angle of rotation of the respective electric motors 12 to the electronic controller 50. The electronic controller 50 computes the travel distance of the autonomous mobile device 3 from the angle of rotation of the respective electric motors 12 that was input.

The laser range finder 20 is mounted on the front part of the autonomous mobile device 3 so as to face the front (forward) direction of the autonomous mobile device 3. The laser range finder 20 scans the circumference of the autonomous mobile device 1 in a fan-like manner in the horizontal direction with a central angle of 240° by emitting a laser and reflecting the emitted laser with a rotating mirror. Subsequently, the laser range finder 20 detects the laser that was returned by reflecting off an object such as a wall or an obstacle, and detects the angle formed with and the distance to the object by measuring the detection angle of the laser (reflected wave) and the time (propagation time) from the emission of the laser to the return thereof upon being reflected off an object. Note that the laser range finder 20 is connected to the electronic controller 50, and outputs, to the electronic controller 50, the detected distance information and angle information relative to the peripheral object.

The electronic controller 50 governs the overall control of the autonomous mobile device 3. The electronic controller 50 preferably includes a microprocessor that performs operations, a ROM that stores programs and the like for causing the microprocessor to execute the respective processes described later, a RAM that temporarily stores various types of data such as operation results and the like, and a backup RAM that retains stored contents. Moreover, the electronic controller 50 preferably includes an interface circuit arranged to electrically connect the laser range finder 20 and the microprocessor, a driver circuit arranged to drive the electric motor 12, and so on.

As described above, the electronic controller 50 plans the travel route, drives the electric motor 12 so that the autonomous mobile device 3 travels along the travel route, acquires the route clearance at the self location (travel point), and controls the electric motor 12 according to the route clearance. Thus, the electronic controller 50 includes a global map acquisition unit 31 arranged to acquire a global map, a route planning unit 35 arranged to plan a travel route, a route clearance acquisition unit 51 arranged to acquire a route clearance of the travel route, a storage unit 52 arranged to store the travel route and the route clearance of the travel route, a self location detector 53 arranged to detect the self location, and a travel controller 54 programmed and arranged to control the electric motor 12 according to the route clearance at the self location. Note that each of the foregoing components is preferably configured by combining the foregoing hardware and software.

The global map acquisition unit 31 uses, for example, SLAM technology or the like to generate a global map recording an area containing obstacle (obstacle area) and an area that does not contain obstacles. Here, a global map is a map that is configured from a plane in which a horizontal plane is divided into blocks of a predetermined size (for example, 1 cm in height and width), and a grid containing an obstacle is given, for example, a value that is greater than "0" and a grid that does not contain an obstacle is given a value that is less than "0". When generating a global map using the SLAM technology, foremost, the global map acquisition unit 31 reads the self location acquired with the self location detection unit 53 described later. Note that the method of acquiring the self location will be described in detail later. Next, the global map acquisition unit projects the local map on the global map by performing coordinate transformation to the local map in which the laser range finder 20 serves as the original point, with the self location being adjusted from the coordinate system, in which the laser range finder 20 generated upon acquiring the self location serves as the original point, to the coordinate system of the global map. The global map acquisition unit 31 repeatedly executes this processing while traveling, and generates a global map of the entire ambient environment by sequentially appending (adding) the local map to the global map.

The route planning unit 35 includes an extended area generation unit 32, an integrated map generation unit 33, a movable area extraction unit 34, and a route searching unit 55 in order to plan the travel route from the global map generated with the global map acquisition unit 31.

Figure 21:
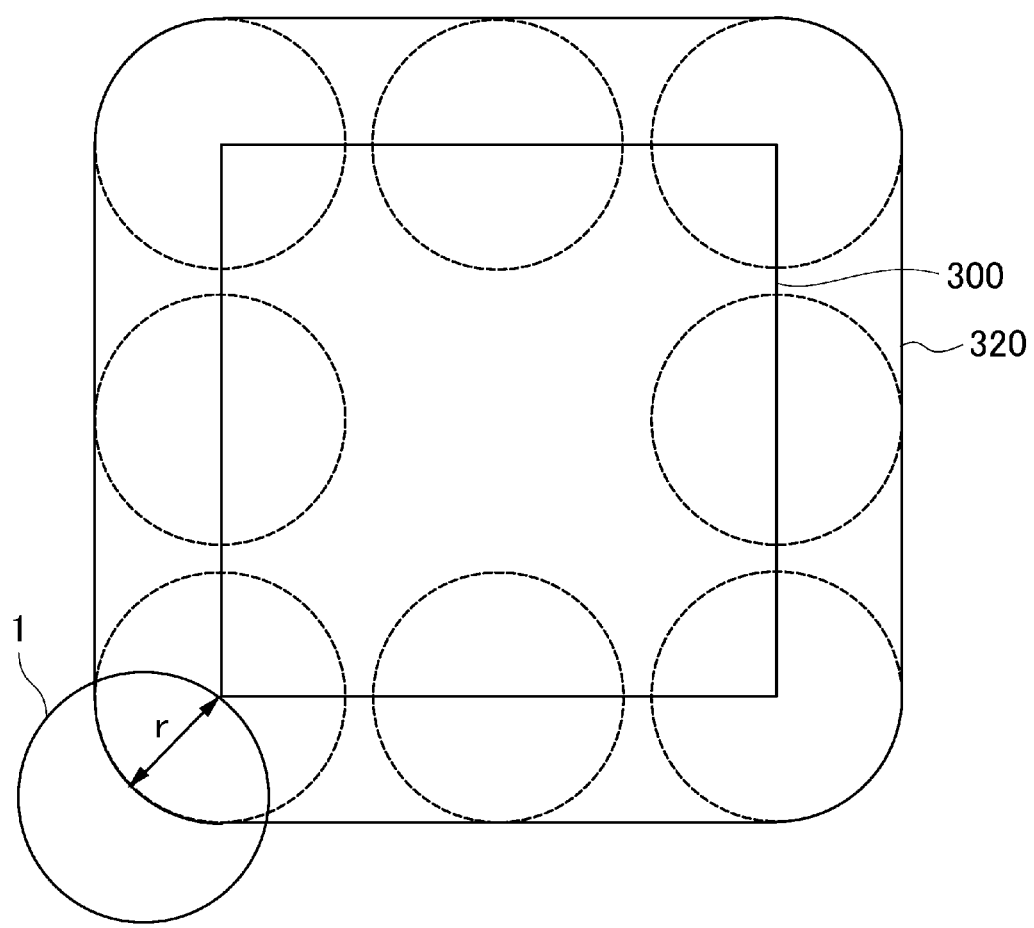
FIG. 21 is a diagram explaining the method of extending the obstacle area (Minkowski sum operation).

The extended area generation unit 32 extends an outline of the obstacle area contained in the global map generated with the global map acquisition unit 31 in an amount corresponding to a radius of the autonomous mobile device 3 to generate an obstacle area that is extended (hereinafter also referred to as the "extended obstacle area"), and additionally extends stepwise an outline of the extended obstacle area in a predetermined range of extension to generate a plurality of extended areas. For the generation of an extended area, for example, the well known Minkowski sum can be used. Specifically, as shown in FIG. 21, the extended obstacle area 320 is generated by extending the outline (boundary) of the obstacle area 300 in an amount corresponding to the radius r of the autonomous mobile device 3. Based on this processing, the size of the autonomous mobile device 3 can be deemed a point relative to the extended obstacle area 320. In addition, the extended area generation unit 32 extends, in three stages, the outline of each extended obstacle area 320 in each predetermined range of extension to generate three extended areas; specifically, a first extended area 321, a second extended area 322, and a third extended area 323 (refer to FIG. 22). Note that, in this preferred embodiment, the radius r of the autonomous mobile device 3 was used as the predetermined range of extension. Specifically, the extended area generation unit 32 generates the first extended area 321 by extending the outline of the extended obstacle area 320 in an amount corresponding to the radius r of the autonomous mobile device 3, generates the second extended area 322 by extending the outline of the first extended area 321 in an amount corresponding to the radius r, and generates the third extended area 323 by extending the outline of the second extended area 322 in an amount corresponding to the radius r.

Figure 22:
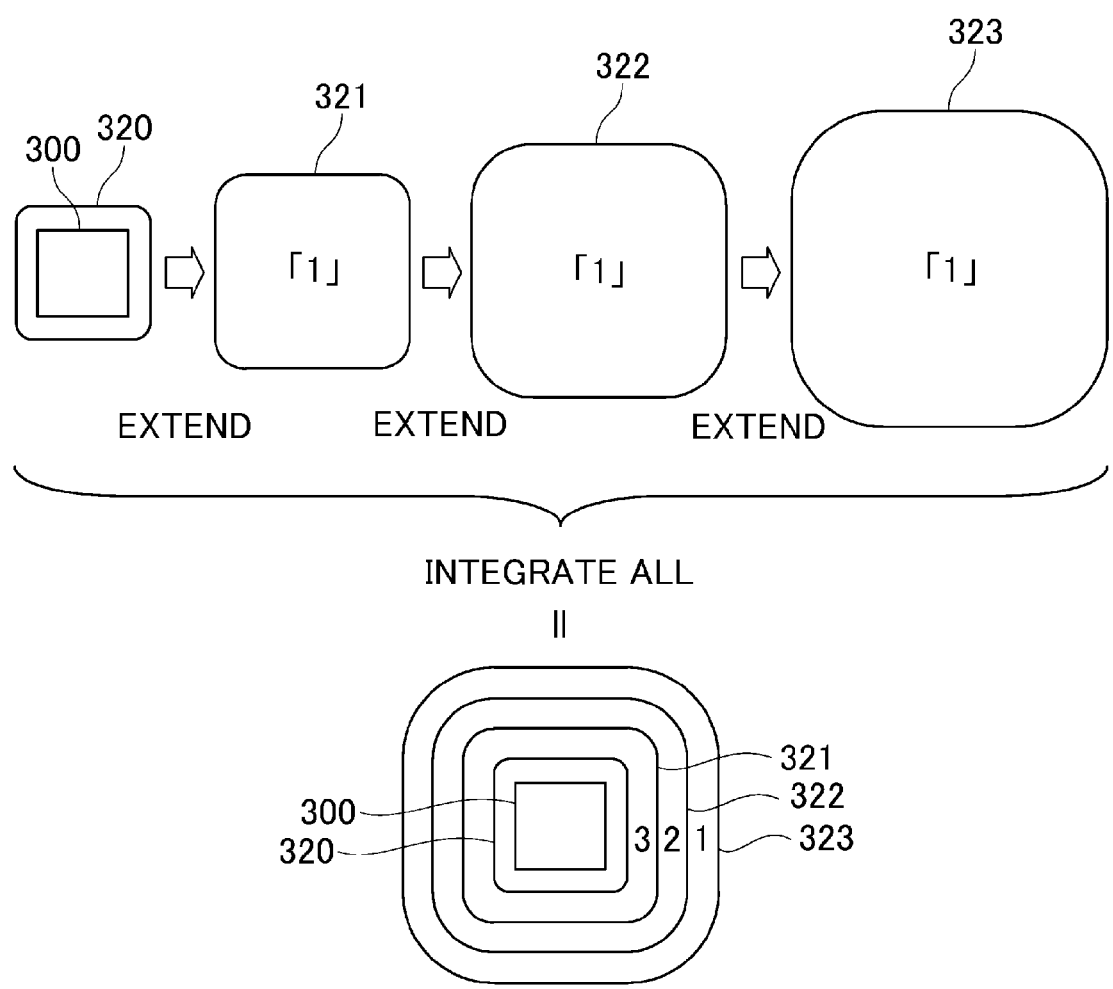
FIG. 22 is a diagram explaining the method of generating the integrated map.

The integrated map generation unit 33 generates an integrated map by superposing and integrating the plurality of extended areas generated with the extended area generation unit 32 (in this preferred embodiment, the extended obstacle area 320, the first extended area 321, the second extended area 322, and the third extended area 323). More specifically, as shown in FIG. 22, the integrated map is generated by superposing and integrating the extended obstacle area 320 and the respective extended areas 321 to 323 after giving, for example, a value (weight) of "1" to all grids respectively contained in the extended obstacle area 320, the first extended area 321, the second extended area 322, and the third extended area 323. Specifically, the integrated value (weight) of the area where the first extended area 321, and the second extended area 322 and the third extended area 323 overlap in the integrated map is "3". Similarly, the integrated value (weight) of an area where only the second extended area 322 and the third extended area 323 overlap (area in which the first extended area 321 is excluded from the second extended area 322) is "2". Moreover, the value (weight) of an area only containing the third extended area 323 (area in which the second extended area 322 is excluded from the third extended area 323) is "1". Thus, the integrated value of the respective areas (respective grids) on the integrated map represents a value corresponding to the distance from the extended obstacle area 320 (that is, the obstacle) with the radius r of the autonomous mobile device 3 as a unit, and is represented as being closer to an obstacle in an area (grid) with a greater integrated value, and, contrarily, as being distant from an obstacle in an area (grid) with a smaller integrated value. Accordingly, the distance (clearance) to the obstacle can be comprehended from the integrated value of the respective areas (respective grids) on the integrated map.

Figure 23:
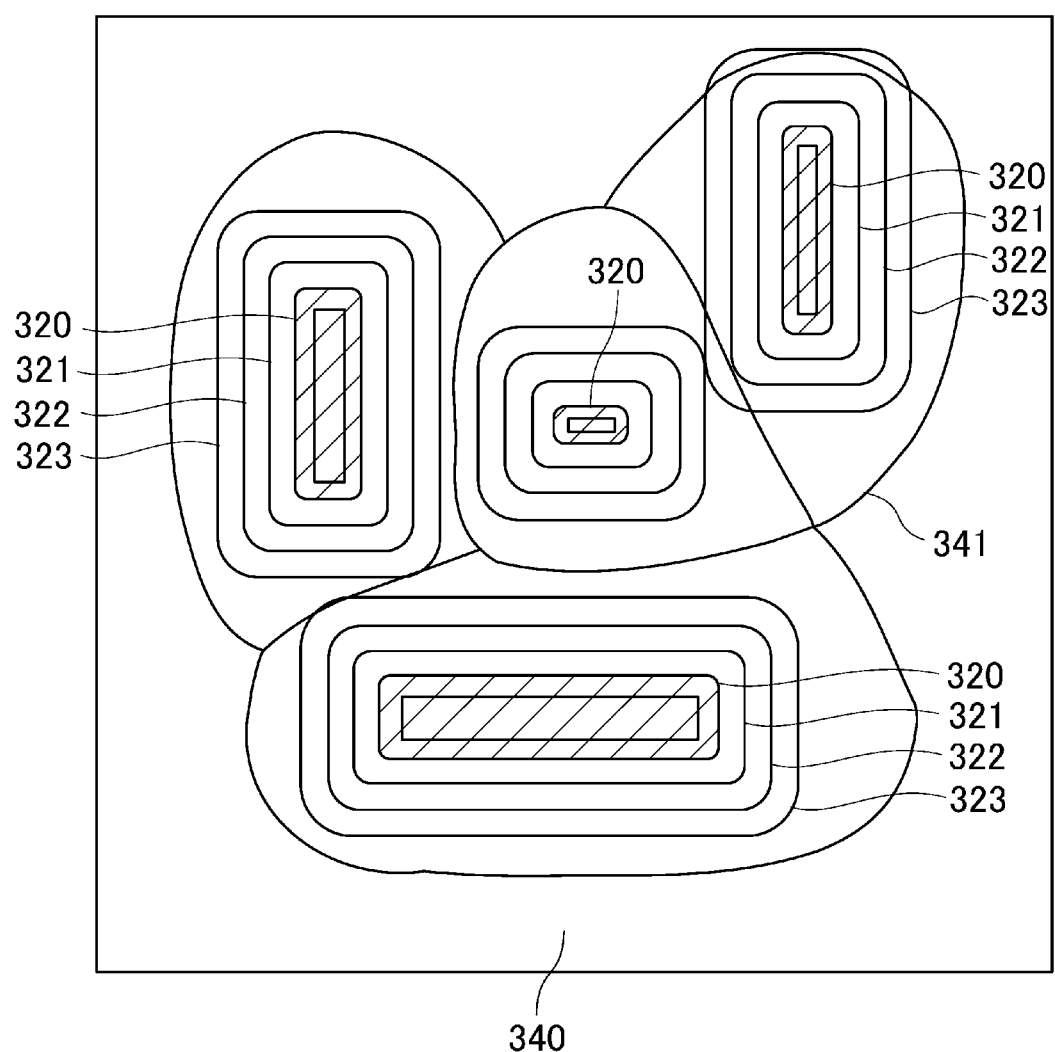
FIG. 23 is a diagram explaining the method of extracting and method of thinning the movable area.

The movable area extraction unit 34 extracts, from the integrated map generated with the integrated map generation unit 33, an area (movable area) where the autonomous mobile device 3 can travel without coming in contact with an obstacle. As shown in FIG. 23, in this preferred embodiment, an area other than the extended obstacle area 320 (area excluding the shaded area in FIG. 23) on the integrated map is extracted as the movable area 340. Moreover, the movable area extraction unit 34 performs the thinning processing of the extracted movable area 340. The thinning processing of the movable area 340 can be performed, for example, by using the well known Hilditch thinning method. Specifically, the movable area extraction unit 34 performs the thinning processing of the movable area 340 by eliminating one pixel at a time from the extended obstacle area 320 until the movable area 340 becomes a line. Accordingly, the linear movable area 341 obtained with the thinning processing represents the movable area that is the farthest from an obstacle existing in the periphery.

Figure 24:
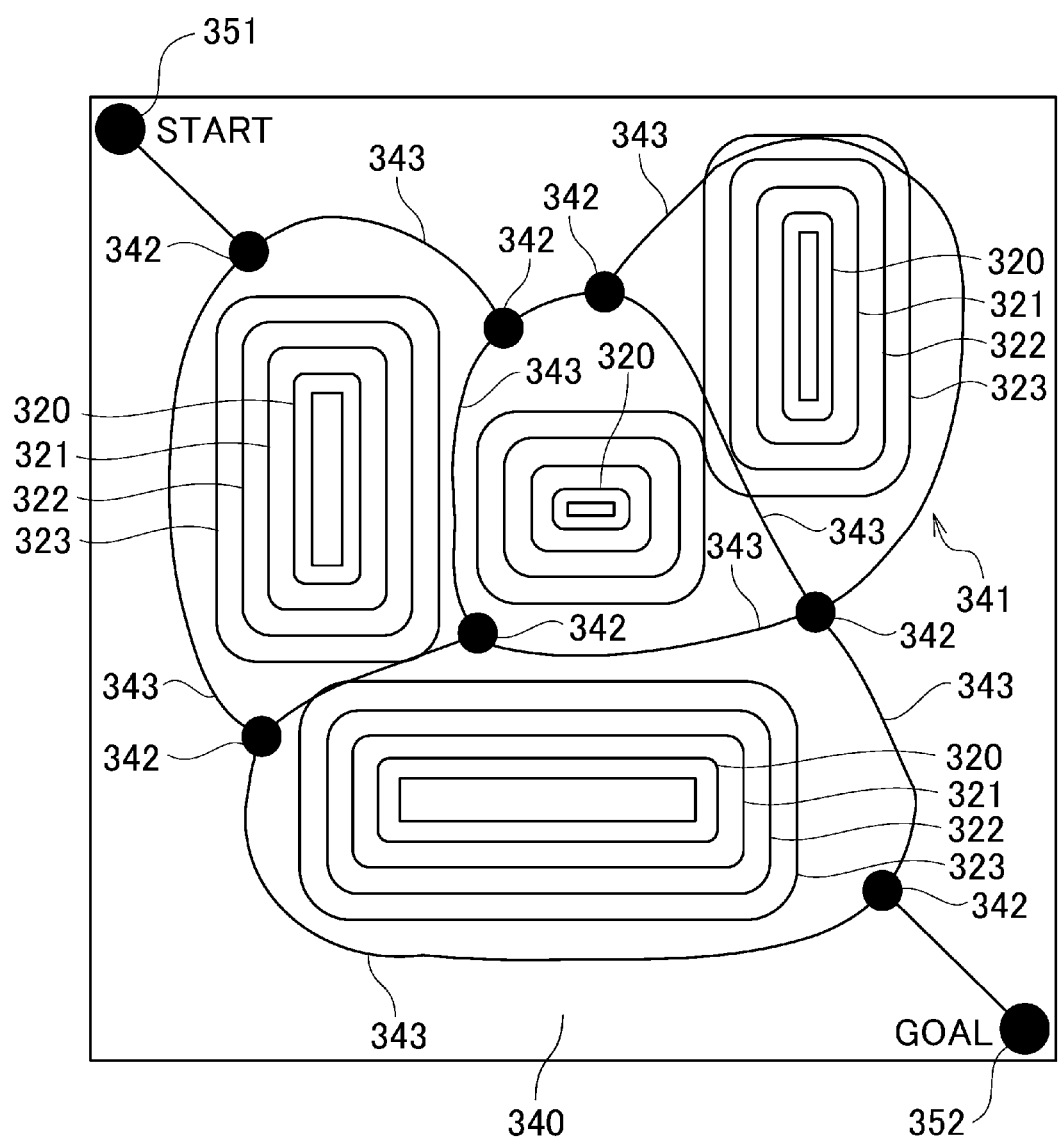
FIG. 24 is a diagram explaining the method of searching for the node.
Figure 25:
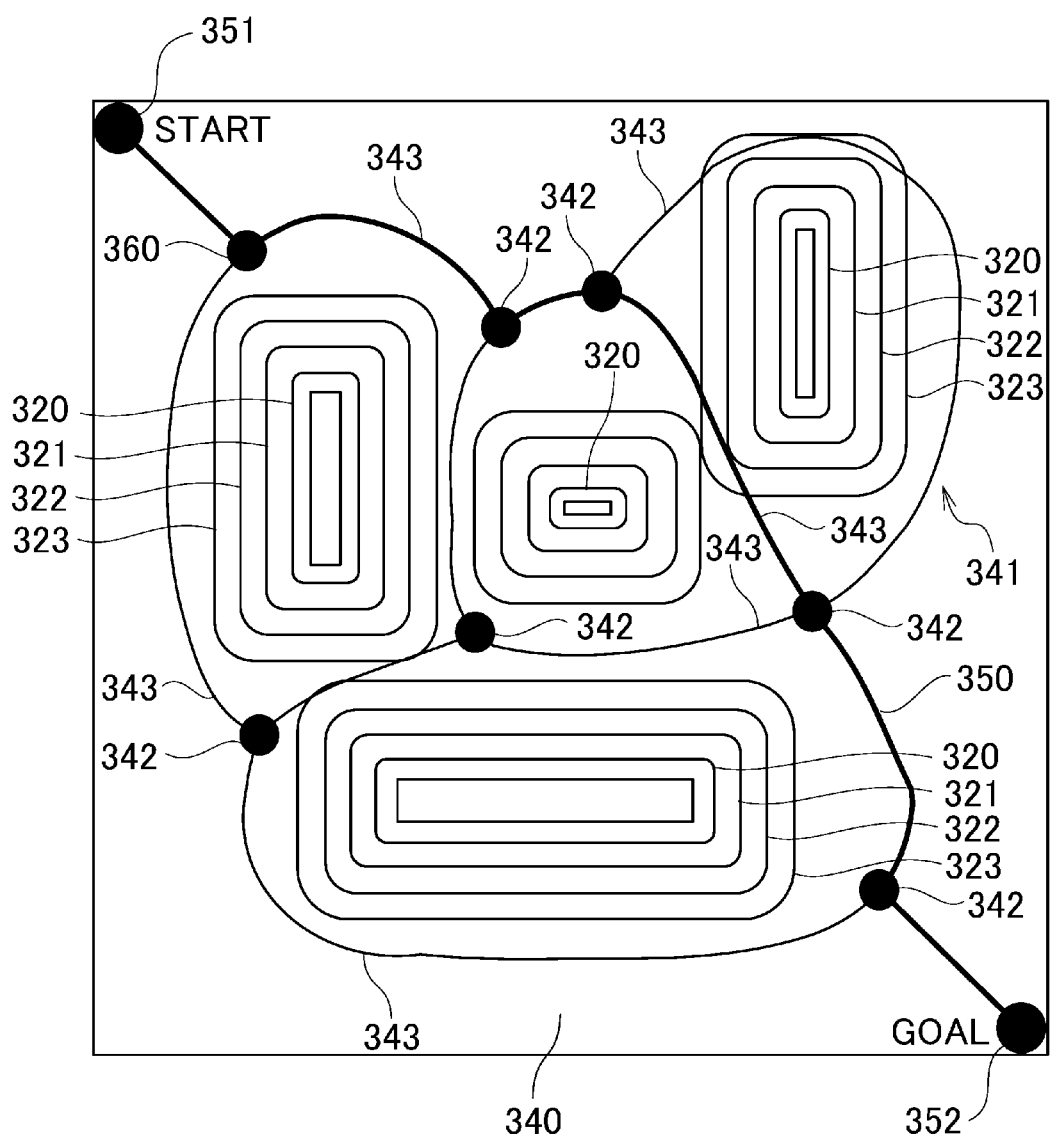
FIG. 25 is a diagram explaining the method of searching for the shortest route.

The route searching unit 55 plans the travel route by searching for the shortest route that connects the starting position and the goal position within the movable area 341 that was extracted and thinned with the movable area extraction unit 34. More specifically, the route searching unit 55 foremost executes the node search of the thinned movable area 341. Specifically, all nodes 342 are searched and represented as a node map as shown in FIG. 24. Note that, here, the branching point (or integration point) of the thinned movable area 341 is referred to as a node 342, and the thinned movable area 341 connecting the node 342 and the node 342 is referred to as a link 343. Next, the route searching unit 55 performs the shortest route search using a search algorithm such as the well known A* algorithm (A star algorithm) or the like and decides the travel route. Specifically, the route searching unit 55 decides the route 350 by using, as shown in FIG. 25, the A* algorithm with the starting position 351 and the goal position 352 as the base points, and computing through which node 342 and which link 343 on the integrated map need to be traveled in order to achieve the minimum cost (shortest route).

Figure 26:
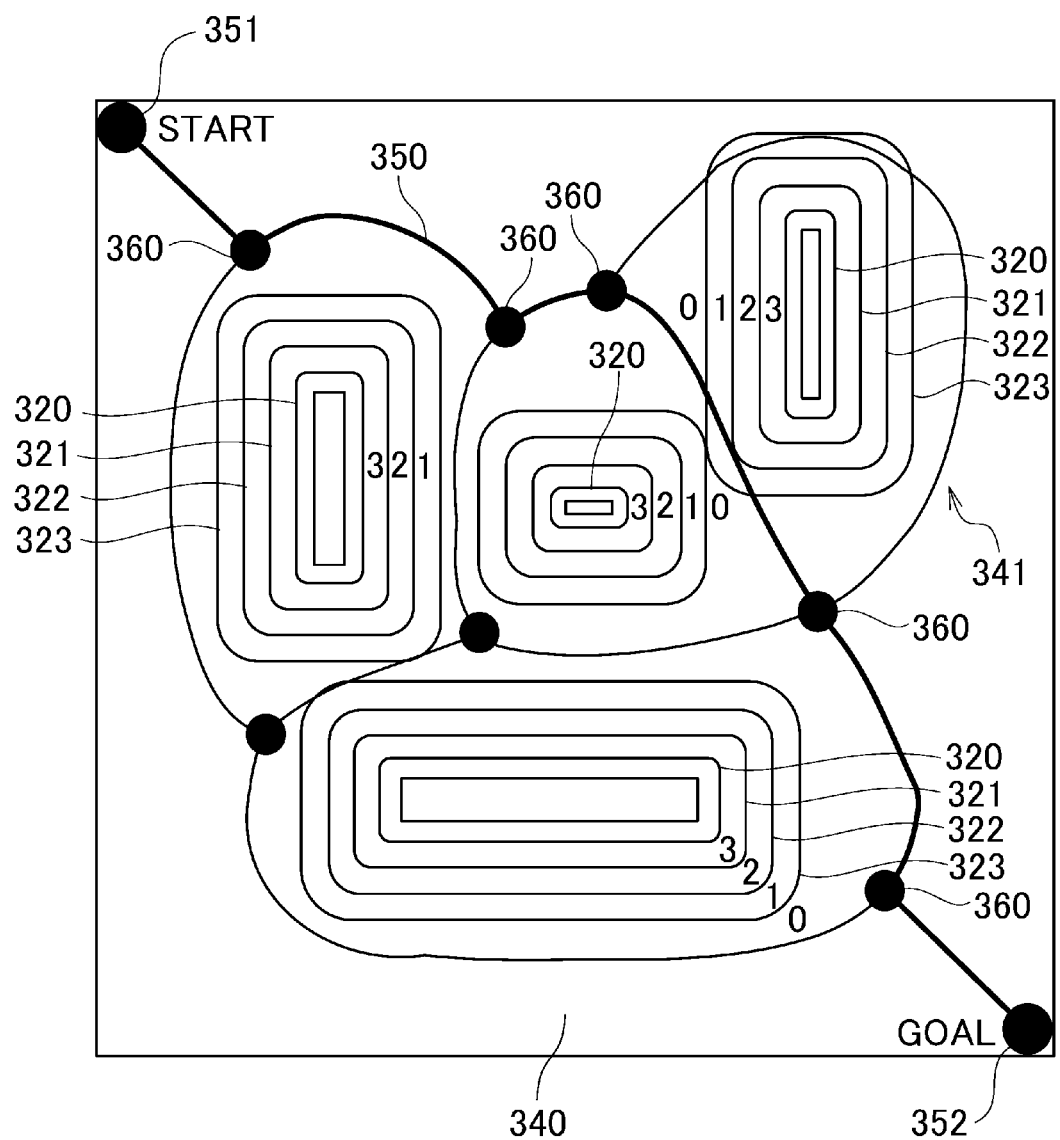
FIG. 26 is a diagram explaining the method of acquiring the route clearance.

The route clearance acquisition unit 51 acquires the clearance of the route at the pass-through point (hereinafter also referred to as the "sub goal") from the extended areas 321 to 323 on the integrated map to which the sub goal on the travel route planned with the route searching unit 55 belongs. More specifically, as shown in FIG. 26, the route clearance acquisition unit 51 acquires the route clearance information for each sub goal 360 depending on the extended area 321 to 323 to which the sub goal 360 on the decided travel route 350 belongs (or the extended area 321 to 323 to which the sub goal 350 does not belong). Here, the foregoing integrated value (for example, "1" "2" "3"; whereby the integrated value of an area that does not belong to any one of the extended areas is "0") of the respective areas on the integrated map can be used as the route clearance information. The route clearance acquisition unit 51 associates and adds the acquired route clearance information of the respective sub goals 360 with and to the route information represented as a sub goal point sequence (coordinate sequence) for each sub goal 360. Travel route information added with route clearance information is thereby acquired.

The storage unit 52 preferably includes, for example, from the foregoing backup RAM or the like, and stores the route information planned with the route planning unit 35 and the route clearance information of the travel route acquired with the route clearance acquisition unit 51.

The self location detection unit 53 estimates the self location; that is, the location of the autonomous mobile device 3 that is traveling. More specifically, the self location detection unit 53 foremost generates a local map based on the distance information and angle information relative to the peripheral object that were read from the laser range finder 20 via the sensor information acquisition unit 36, and additionally computes the travel distance of the autonomous mobile device 3 based on the angle of rotation of the respective electric motors 12 read from the encoder 16. Next, self location detection unit 53 stochastically estimates the self location using the Bayesian filtering (Bayes' theorem) from the generated local map and the travel distance of the autonomous mobile device 3.

The travel control unit 54 acquires the route clearance at the self location based on the self location detected with the self location detection unit 53, and the route information and route clearance information stored in the storage unit 52, and controls the travel of the autonomous mobile device 3 by controlling the electric motor 12 according to the route clearance. More specifically, the travel control unit 54 foremost detects a sub goal which coincides with or is closest to the self location from the sub goal point sequence (coordinate sequence) contained in the route information, and acquires the route clearance information at that sub goal, which is stored by being associated with that sub goal. Note that, as the route clearance information, rather than adopting a value of one sub goal that is the closest, a value of a sub goal that is positioned on the side that is closer to the goal than the detected closest sub goal and which is the narrowest (largest value) within the route clearance information of a plurality of sub goals contained in a certain definite range from the self range may be used.

Next, the travel control unit 54 sets the target travel speed according to the acquired route clearance information. For example, the travel control unit 54 sets the target travel speed to 4 km/h if the route clearance information is "0", sets the target travel speed to 3 km/h if the route clearance information is "1", sets the target travel speed to 2 km/h if the route clearance information is "2", and sets the target travel speed to 1 km/h if the route clearance information is "3". Specifically, the target travel speed is set so that the speed of the autonomous mobile device 3 becomes slower as the route clearance becomes smaller (that is, as the passage width becomes narrower). Note that, in substitute for setting the target travel speed according to the route clearance information, the configuration may be such that a coefficient is set according to the route clearance information, and the coefficient is multiplied with the target travel speed that is set based on other parameters. In the foregoing case, for example, the coefficient is set to "1" if the route clearance information is "0", the coefficient is set to "3/4" if the route clearance information is "1", the coefficient is set to "2/4" if the route clearance information is "2", and the coefficient is set to "1/4" if the route clearance information is "3". Specifically, the coefficient is set so that the travel speed becomes slower as the route clearance becomes smaller.

Moreover, the travel control unit 54 includes an obstacle avoidance control unit 56 arranged to set the avoidance force (hereinafter also referred to as the "repulsion") for avoiding obstacles according to the route clearance at the self location, and avoids the obstacles by driving the electric motor 12 based on the repulsion set with the obstacle avoidance control unit 56. Here, in this preferred embodiment, a virtual potential method was adopted as the control method of moving the autonomous mobile device 3 to the goal position while avoiding obstacles. The virtual potential method is a method of generating a virtual gravitation potential field relative to the goal position and a virtual repulsion potential field relative to the obstacle to be avoided, and superposing these to generate a route that heads to the goal position while avoiding contact with the obstacles. In this preferred embodiment, the route clearance is adopted as one parameter used to set the repulsion of the virtual potential method.

More specifically, the travel control unit 54 foremost calculates the virtual gravitation for heading to the goal position based on the self location. Meanwhile, the obstacle avoidance control unit 56 calculates the virtual repulsion for avoiding obstacles based on the self location, travel speed, position and speed of the obstacle, as well as based on the coefficient that is set according to the speed and route clearance information. Here, as the coefficient that is set as the route clearance information, for example, the same coefficient as the foregoing coefficient that is multiplied with the target travel speed can be used. Specifically, the coefficient is set so that the virtual repulsion becomes smaller (manner of avoidance becomes gradual) as the route clearance becomes smaller. Subsequently, the travel control unit 54 calculates the virtual force vector by performing vector synthesis to the obtained virtual gravitation and virtual repulsion. The travel control unit 54 controls the travel of the autonomous mobile device 3 to move to the goal position while avoiding obstacles by driving the electric motor 12 (omni wheel 13) according to the obtained virtual force vector.

In this preferred embodiment, since the route clearance at the self location is comprehended, it is possible to estimate whether the detected object is the wall of the passage or an obstacle based on the distance to the object detected with the laser range finder 20. Here, if the detected object is a wall and not an obstacle, the operation taking the foregoing avoidance operation (operation for obtaining the virtual repulsion) can be omitted.

Figure 27:
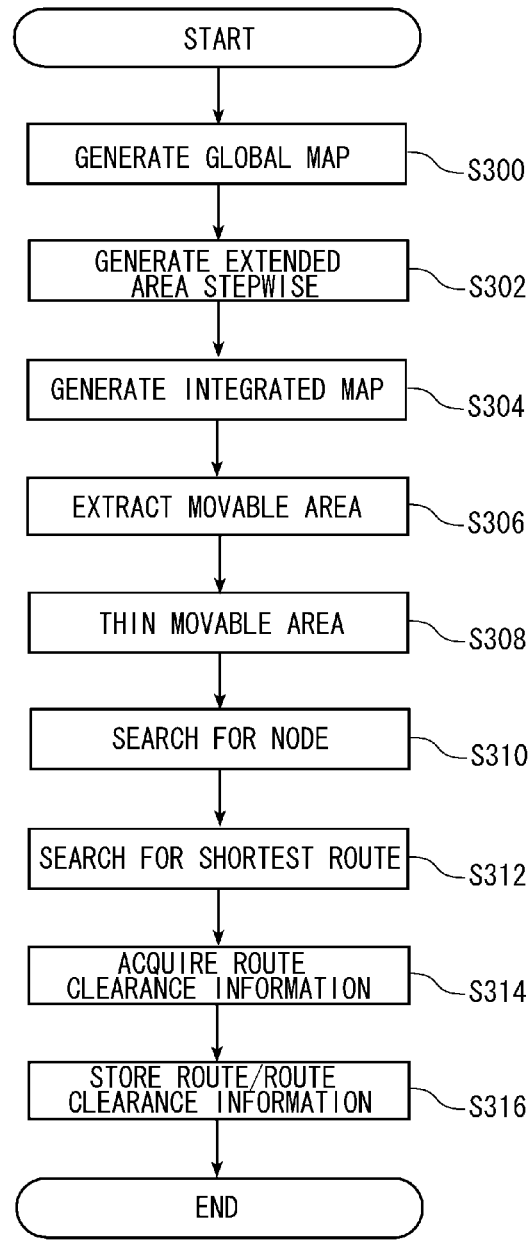
FIG. 27 is a flowchart showing the processing routine of the route planning processing performed by the autonomous mobile device according to the third preferred embodiment of the present invention.
Figure 28:
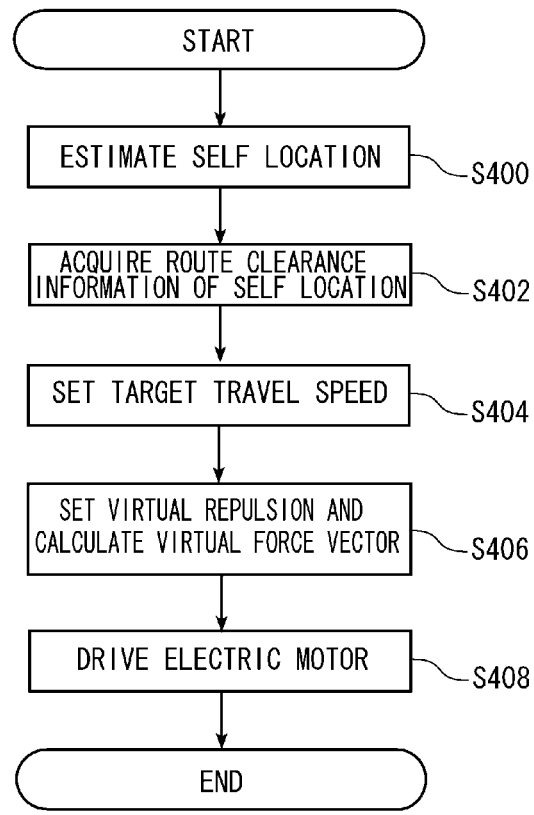
FIG. 28 is a flowchart showing the processing routine of the travel control processing performed by the autonomous mobile device according to the third preferred embodiment of the present invention.

The operation of the autonomous mobile device 3 is now explained with reference to FIG. 27 and FIG. 28. FIG. 27 is a flowchart showing the processing routine of the route planning processing performed by the autonomous mobile device 3. Moreover, FIG. 28 is a flowchart showing the processing routine of the travel control processing performed by the autonomous mobile device 3. The route planning processing shown in FIG. 27 is performed by the electronic controller 50, and is executed, for example, based on the user's command operations before performing the autonomous travel. Moreover, the travel control processing shown in FIG. 28 is performed by the electronic controller 50, and is repeatedly executed at a predetermined timing when the autonomous mobile device 3 is autonomously traveling.

The processing routine of the route planning processing shown in FIG. 27 is foremost explained. At step S300, a global map is generated based on the distance information, angle information and the like relative to the peripheral object which were read from the laser range finder 20. Note that the method of generating a global map is as described above, and the detailed explanation thereof is omitted. Next, at step S302, the extended obstacle area 320 is foremost generated by its outline being extended in an amount corresponding to the radius r of the autonomous mobile device 3 for each obstacle area 300 contained in the global map. At step S302, the extended obstacle area 320 is additionally extended, in three stages, in each predetermined range of extension (radius r of the autonomous mobile device 3 in this preferred embodiment), and three extended areas; specifically, the first extended area 321, the second extended area 322, and the third extended area 323 are generated (refer to FIGS. 21 and 22).

At subsequent step S304, an integrated map is generated as a result of the extended obstacle area 320, the first extended area 321, the second extended area 322, and the third extended area 323 generated at step S302 being superposed and integrated (refer to FIG. 22). Subsequently, at step S306, the area excluding the extended obstacle area 320 is extracted from the integrated map generated at step S304 as the movable area 340 where the autonomous mobile device 3 can travel without coming in contact with an obstacle (refer to FIG. 23). Next, at step S308, the thinning processing of the extracted movable area 340 is performed. Note that the thinning processing of the movable area 340 is as described above, and the detailed explanation thereof is omitted.

At subsequent step S310, the node search of the thinned movable area 341 is executed (refer to FIG. 24). Subsequently, at step S312, for example, the A* algorithm is used with the starting position and the goal position as the base points, and through which node 342 and which link 343 on the integrated map need to be traveled in order to achieve the minimum cost (shortest route) is searched, and decided as the route 350 (refer to FIG. 25).

At subsequent step S314, the route clearance information ("0" "1" "2" "3") is acquired for each sub goal 360 depending on the extended area 321 to 323 to which the sub goal 360 on the decided route 350 belongs (or the extended area 321 to 323 to which the sub goal 350 does not belong) (refer to FIG. 26). Route information added with route clearance information is acquired as a result of associating and adding the acquired route clearance information of the respective sub goals 360 with and to the route information represented as a sub goal point sequence (coordinate sequence) for each sub goal 360. The route information added with the route clearance information (that is, the route information and route clearance information) acquired at step S314 is stored in the storage unit 52 at step S316.

The travel control processing shown in FIG. 28 is now explained. At step S400, the self location during travel is estimated using the Bayesian filtering from the local map generated based on the distance and angle information relative to the object, and the travel distance of the autonomous mobile device 3 that was computed based on the angle of rotation of the respective electric motors 12. At subsequent step S402, a sub goal which coincides with or is closest to the self location is detected from the sub goal point sequence (coordinate sequence) contained in the route information, and the route clearance information at that sub goal, which is stored by being associated with that sub goal, is acquired. Note that, as described above, as the route clearance information, rather than adopting a value of one sub goal that is the closest, a value of a sub goal that is positioned on the side that is closer to the goal than the detected closest sub goal and which is the narrowest (largest value) within the route clearance information of a plurality of sub goals contained in a certain definite range from the self range may be used.

Next, at step S404, the target travel speed is set according to the acquired route clearance information. Here, the target travel speed is set so that the speed of the autonomous mobile device 3 becomes slower as the route clearance becomes narrower (that is, as the passage width becomes narrower). Note that, since the method of setting the target travel speed is as described above, the detailed explanation thereof is omitted.

Subsequently, at step S406, a virtual repulsion for avoiding obstacles according to the route clearance information acquired at step S402 is set. Here, the virtual repulsion is set so that the virtual repulsion becomes smaller (that is, the manner of avoidance becomes smaller) as the route clearance becomes smaller. Since the method of setting the virtual repulsion is as described above, the detailed explanation thereof is omitted. In addition, at step S406, a virtual gravitation for heading toward the goal position based on the self location is calculated, and a virtual force vector is calculated by the obtained virtual gravitation and virtual repulsion being subject to vector synthesis.

At subsequent step S408, the electric motor 12 (omni wheel 13) is driven based on the target travel speed set at step S404 and the virtual force vector obtained at step S406. Thus, the travel speed and avoidance force (repulsion) are adjusted to optimal values according to the clearance (passage width) of the route on which the autonomous mobile device 3 is traveling.

According to this preferred embodiment, a travel route is planned from the acquired global map, and a route clearance of the travel route is acquired. Meanwhile, the route clearance at the self location is comprehended from the detected self location and the acquired route clearance of the travel route. The electric motor 12 is controlled according to the comprehended route clearance at the self location. Thus, the appropriate travel control can be performed according to the route clearance at the travel point, upon traveling along the travel route.

More specifically, according to this preferred embodiment, the target travel speed is set according to the route clearance of the travel point. Thus, it is possible to travel at an appropriate travel speed according to the route clearance of the travel point. Accordingly, it is possible to travel slowly in a narrow passage, and, contrarily, travel at a faster speed in a wide passage.

Moreover, according to this preferred embodiment, the repulsion for avoiding obstacles can be adjusted according to the route clearance of the travel point. Thus, it is possible to slowly and narrowly avoid the obstacle in a narrow passage, and, contrarily, quickly avoid, with considerable clearance, the obstacle in a wide passage.

According to this preferred embodiment, the travel route and the route clearance of the travel route are acquired and stored in advance. Thus, since it is no longer necessary to obtain the route clearance of the travel route while the autonomous mobile device is traveling, it is possible to reduce the calculation load and reduce the control delay while the autonomous mobile device is traveling.

A preferred embodiment of the present invention was explained above, but the present invention is not limited to the foregoing preferred embodiment, and can be modified variously. For example, in the foregoing preferred embodiment, although the extended obstacle area 320 was preferably extended stepwise and integrated, and the route clearance at the sub goal was preferably obtained from the extended areas 321 to 323 to which that sub goal belongs, the method of obtaining the route clearance is not limited to the foregoing method. For example, the route clearance may also be obtained by computing the Euclid distance to the obstacle for each sub goal.

Note that, when adopting the foregoing method as the method of obtaining the route clearance, in the foregoing preferred embodiment, although the radius r of the autonomous mobile device 3 was preferably used as the range of extension upon extending the extended obstacle area 320, the range of extension is not limited to the radius r of the autonomous mobile device 3, and may be arbitrarily set. Moreover, in the foregoing preferred embodiment, although the extended obstacle area 320 was preferably extended in three stages, it may also be extended in two stages or four stages or more. In addition, the value (weight) that is given to the grids configuring the respective extended areas 321 to 323 upon integrating the respective extended areas 321 to 323 is not limited to "1", and an arbitrary value may be set.

In this preferred embodiment, although the target travel speed and the like are preferably set according to the route clearance of the travel point during autonomous travel, the configuration may also be such that the target travel speed, coefficient and the like are obtained for each sub goal and stored in the storage unit 52 in advance at the point in time that the travel route is planned and the route clearance information is acquired.

In this preferred embodiment, although the A* algorithm was preferably used for the shortest route search, another algorithm, for example, the Dijkstra method, the best-first search or the like may also be used.

In this preferred embodiment, although the SLAM technology was preferably used upon generating a global map, the global map may also be generated using a method other than SLAM. Moreover, a global map generated with another device may be transferred.

In this preferred embodiment, although the laser range finder 20 was preferably used for measuring the distance to the obstacle upon generating a global map, the configuration may use, in substitute for or in addition to the laser range finder, for example, a stereo camera, an ultrasonic sensor and the like.

In this preferred embodiment, although an omni wheel 13 capable of moving in all directions was preferably used as the wheel, the configuration may also use a standard wheel (steering wheel and drive wheel). Moreover, the number of omni wheels 13 is not limited to four, and, for example, it may be three or six.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A route planning device for planning a travel route to be used by an autonomous mobile device, which travels along the travel route, before the autonomous mobile device travels autonomously, the device comprising:

an environmental map acquisition unit arranged to acquire an environmental map showing an obstacle area in which an obstacle exists;

a movable area extraction unit arranged to extract a movable area from the environmental map acquired by the environmental map acquisition unit and thinning the extracted movable area;

a route planning unit arranged to plan a travel route from the thinned movable area extracted by the movable area extraction unit by searching for the shortest route to the destination;

a linearization unit arranged to linearize the travel route planned by the route planning unit without interfering with the obstacle area; and a smoothing unit arranged to smooth the travel route linearized by the linearization unit without interfering with the obstacle area; wherein the smoothing unit extracts a point on the linearized travel route and two points on the linearized travel route sandwiching the point, connects the two points with a straight line, and, when the connected straight line does not interfere with the obstacle area, re-sets the straight line as a travel route which connects the two points; and the smoothing unit smoothes the travel route when an angle formed by the extracted three points is not greater than a certain value that is set forth according to mobility of the autonomous mobile device.

2. The route planning device according to claim 1, wherein the movable area extraction unit generates an extended obstacle area by extending the outline of the obstacle area on the environmental map in an amount corresponding to a radius of the autonomous mobile device, and extracts an area excluding the extended obstacle area as the movable area.

3. An autonomous mobile device which travels along a planned travel route in an ambient environment, the autonomous mobile device comprising the route planning device according to claim 1.

* * * * *